(12) United States Patent
Lee et al.

(10) Patent No.: US 10,592,528 B2
(45) Date of Patent: Mar. 17, 2020

(54) WORKLOAD CAPTURE AND REPLAY FOR REPLICATED DATABASE SYSTEMS

(71) Applicant: SAP SE, Walldorf (DE)

(72) Inventors: Chul Won Lee, Seoul (KR); Juchang Lee, Seoul (KR); Hyogi Jung, Seoul (KR)

(73) Assignee: SAP SE, Walldorf (DE)

( * ) Notice: Subject to any disclaimer, the term of this patent is extended or adjusted under 35 U.S.C. 154(b) by 407 days.

(21) Appl. No.: 15/442,838

(22) Filed: Feb. 27, 2017

(65) Prior Publication Data
US 2018/0246945 A1 Aug. 30, 2018

(51) Int. Cl.
| | |
|---|---|
| G06F 16/27 | (2019.01) |
| G06F 16/23 | (2019.01) |
| G06F 11/34 | (2006.01) |
| G06F 11/14 | (2006.01) |
| G06F 11/20 | (2006.01) |

(52) U.S. Cl.
CPC ............ *G06F 16/27* (2019.01); *G06F 11/14* (2013.01); *G06F 11/3433* (2013.01); *G06F 11/3476* (2013.01); *G06F 11/3495* (2013.01); *G06F 16/2358* (2019.01); *G06F 11/1471* (2013.01); *G06F 11/2035* (2013.01); *G06F 11/2048* (2013.01); *G06F 11/2097* (2013.01); *G06F 11/3414* (2013.01); *G06F 2201/80* (2013.01)

(58) Field of Classification Search
CPC ............ G06F 11/1471; G06F 11/2097; G06F 11/2035; G06F 2201/82; G06F 11/3476; G06F 16/2372; G06F 16/27; G06F 11/0766; G06F 11/1662; G06F 11/3433; G06F 11/3495
See application file for complete search history.

(56) References Cited

U.S. PATENT DOCUMENTS

| | | |
|---|---|---|
| 6,086,617 A | 7/2000 | Waldon et al. |
| 7,168,065 B1 | 1/2007 | Naccache et al. |

(Continued)

OTHER PUBLICATIONS

"Concurrency Control: Locking, Optimistic, Degrees of Consistency," retrieved from https://people.eecs.berkeley.edu/~brewer/cs262/cc.pdf, on or before May 2016, 6 pages.

(Continued)

*Primary Examiner* — Angelica Ruiz
(74) *Attorney, Agent, or Firm* — Jones Day

(57) ABSTRACT

A computer implemented method is provided for capturing and replaying a database workload by obtaining a workload capture file comprising execution context information generated in a database system and replayable to replicate the workload, generating a modified workload capture file by generating modified execution context information, replaying the modified workload capture file by generating at least one read statement based on the modified workload execution information and issuing at least one read statement to a primary database system having an associated secondary database system, determining that the at least one read statement may be routed to the secondary database system for execution, and routing the read statement to the secondary database system for execution. Related apparatus, systems, techniques and articles are also described.

20 Claims, 16 Drawing Sheets

(56) References Cited

U.S. PATENT DOCUMENTS

| | | |
|---|---|---|
| 7,305,421 B2 | 12/2007 | Cha et al. |
| 7,930,274 B2 | 4/2011 | Hwang et al. |
| 8,046,334 B2 | 10/2011 | Hwang et al. |
| 8,442,962 B2 | 5/2013 | Lee et al. |
| 8,504,691 B1 | 8/2013 | Tobler et al. |
| 8,700,660 B2 | 4/2014 | Lee et al. |
| 8,768,927 B2 | 7/2014 | Yoon et al. |
| 8,782,100 B2 | 7/2014 | Yoon et al. |
| 8,793,276 B2 | 7/2014 | Lee et al. |
| 8,918,436 B2 | 12/2014 | Yoon et al. |
| 8,935,205 B2 | 1/2015 | Hildenbrand et al. |
| 8,954,397 B2 * | 2/2015 | Wang ............ G06F 16/21 707/687 |
| 9,009,182 B2 | 4/2015 | Renkes et al. |
| 9,037,677 B2 | 5/2015 | Lee et al. |
| 9,063,969 B2 | 6/2015 | Lee et al. |
| 9,098,522 B2 | 8/2015 | Lee et al. |
| 9,119,056 B2 | 8/2015 | Hourani et al. |
| 9,165,010 B2 | 10/2015 | Faerber et al. |
| 9,171,020 B2 | 10/2015 | Faerber et al. |
| 9,336,262 B2 | 5/2016 | Lee et al. |
| 9,336,284 B2 | 5/2016 | Lee et al. |
| 9,361,340 B2 | 6/2016 | Jeong et al. |
| 9,465,829 B2 | 10/2016 | Faerber et al. |
| 9,465,843 B2 | 10/2016 | Yoon et al. |
| 9,465,844 B2 | 10/2016 | Faerber et al. |
| 9,483,516 B2 | 11/2016 | Lee et al. |
| 9,501,502 B2 | 11/2016 | Lee et al. |
| 9,558,229 B2 | 1/2017 | Lee et al. |
| 9,558,258 B2 | 1/2017 | Yoon et al. |
| 9,594,799 B2 | 3/2017 | Faerber et al. |
| 9,619,514 B2 | 4/2017 | Mindnich et al. |
| 9,635,093 B2 | 4/2017 | Lee et al. |
| 9,720,949 B2 | 8/2017 | Lee et al. |
| 9,720,992 B2 | 8/2017 | Lee et al. |
| 9,740,715 B2 | 8/2017 | Faerber et al. |
| 9,792,318 B2 | 10/2017 | Schreter et al. |
| 9,798,759 B2 | 10/2017 | Schreter et al. |
| 9,850,074 B2 | 10/2017 | Lee et al. |
| 9,824,134 B2 | 11/2017 | Schreter et al. |
| 9,846,724 B2 | 12/2017 | Weyerhaeuser et al. |
| 9,892,163 B2 | 2/2018 | Kim et al. |
| 2002/0015829 A1 | 2/2002 | Kim |
| 2002/0191797 A1 | 12/2002 | Perlman |
| 2003/0061537 A1 | 3/2003 | Cha et al. |
| 2005/0099960 A1 | 5/2005 | Boss et al. |
| 2005/0149907 A1 * | 7/2005 | Seitz ............ G06F 9/5016 717/108 |
| 2005/0262512 A1 | 11/2005 | Schmidt et al. |
| 2006/0190243 A1 * | 8/2006 | Barkai ............ G06F 16/278 704/8 |
| 2008/0033914 A1 | 2/2008 | Cherniack et al. |
| 2008/0091806 A1 | 4/2008 | Shen et al. |
| 2008/0097960 A1 | 4/2008 | Dias |
| 2008/0065670 A1 | 5/2008 | Cha et al. |
| 2009/0070330 A1 | 3/2009 | Hwang et al. |
| 2009/0254774 A1 | 10/2009 | Chamdani |
| 2009/0254971 A1 * | 10/2009 | Herz ............ G06Q 10/10 726/1 |
| 2010/0205323 A1 | 8/2010 | Barsness et al. |
| 2011/0161300 A1 | 6/2011 | Hwang et al. |
| 2011/0276550 A1 | 11/2011 | Colle |
| 2012/0084273 A1 | 4/2012 | Lee et al. |
| 2012/0084274 A1 | 4/2012 | Renkes et al. |
| 2012/0150913 A1 | 6/2012 | De Smet et al. |
| 2012/0166407 A1 | 6/2012 | Lee et al. |
| 2012/0167098 A1 | 6/2012 | Lee et al. |
| 2012/0173515 A1 | 7/2012 | Jeong et al. |
| 2012/0216244 A1 | 8/2012 | Kumar et al. |
| 2012/0221513 A1 * | 8/2012 | Papadomanolakis ... G06F 16/25 707/610 |
| 2012/0221519 A1 | 8/2012 | Papadomanolakis |
| 2012/0284295 A1 * | 11/2012 | Wang ............ G06F 16/24539 707/769 |
| 2013/0042003 A1 | 2/2013 | Franco et al. |
| 2013/0124475 A1 | 5/2013 | Hildenbrand et al. |
| 2013/0144866 A1 | 6/2013 | Jerzak |
| 2013/0166534 A1 | 6/2013 | Yoon et al. |
| 2013/0166553 A1 | 6/2013 | Yoon et al. |
| 2013/0166554 A1 | 6/2013 | Yoon et al. |
| 2013/0275457 A1 | 10/2013 | Lee et al. |
| 2013/0275468 A1 | 10/2013 | Lee et al. |
| 2013/0275550 A1 | 10/2013 | Lee et al. |
| 2013/0290282 A1 | 10/2013 | Faerber et al. |
| 2013/0304714 A1 | 11/2013 | Lee et al. |
| 2014/0006358 A1 * | 1/2014 | Wang ............ G06F 16/21 707/687 |
| 2014/0122439 A1 | 5/2014 | Faerber et al. |
| 2014/0122452 A1 | 5/2014 | Faerber et al. |
| 2014/0136473 A1 | 5/2014 | Faerber et al. |
| 2014/0136788 A1 | 5/2014 | Faerber et al. |
| 2014/0149353 A1 | 5/2014 | Lee et al. |
| 2014/0149368 A1 | 5/2014 | Lee et al. |
| 2014/0149527 A1 | 5/2014 | Lee et al. |
| 2014/0156619 A1 | 6/2014 | Lee et al. |
| 2014/0222418 A1 | 8/2014 | Richtarsky et al. |
| 2014/0244628 A1 | 8/2014 | Yoon et al. |
| 2014/0297686 A1 | 10/2014 | Lee |
| 2014/0304219 A1 | 10/2014 | Yoon et al. |
| 2014/0337393 A1 * | 11/2014 | Burchall ............ G06F 9/466 707/826 |
| 2015/0026154 A1 | 1/2015 | Jeong et al. |
| 2015/0074082 A1 | 5/2015 | Yoon et al. |
| 2015/0149409 A1 | 5/2015 | Lee et al. |
| 2015/0149413 A1 | 5/2015 | Lee et al. |
| 2015/0149426 A1 | 5/2015 | Kim et al. |
| 2015/0149442 A1 | 5/2015 | Kim et al. |
| 2015/0149704 A1 | 5/2015 | Lee et al. |
| 2015/0149736 A1 | 5/2015 | Kwon et al. |
| 2015/0178343 A1 | 6/2015 | Renkes et al. |
| 2015/0242400 A1 | 8/2015 | Bensberg et al. |
| 2015/0242451 A1 | 8/2015 | Bensberg et al. |
| 2015/0261805 A1 | 9/2015 | Lee et al. |
| 2015/0347410 A1 | 12/2015 | Kim et al. |
| 2015/0363463 A1 | 12/2015 | Mindnich et al. |
| 2016/0004786 A1 | 1/2016 | Bosman et al. |
| 2016/0042016 A1 | 2/2016 | Faerber et al. |
| 2016/0042028 A1 | 5/2016 | Faerber et al. |
| 2016/0140175 A1 | 5/2016 | Weyerhaeuser et al. |
| 2016/0147617 A1 | 5/2016 | Lee et al. |
| 2016/0147618 A1 | 5/2016 | Lee et al. |
| 2016/0147813 A1 | 5/2016 | Lee et al. |
| 2016/0147814 A1 | 5/2016 | Goel et al. |
| 2016/0147821 A1 | 5/2016 | Schreter et al. |
| 2016/0147834 A1 | 5/2016 | Lee et al. |
| 2016/0147858 A1 | 5/2016 | Lee et al. |
| 2016/0147859 A1 | 5/2016 | Lee et al. |
| 2016/0147861 A1 | 5/2016 | Schreter |
| 2016/0147862 A1 | 5/2016 | Schreter |
| 2016/0147906 A1 | 5/2016 | Schreter |
| 2016/0292227 A1 | 10/2016 | Jeong et al. |
| 2016/0364440 A1 | 12/2016 | Lee et al. |
| 2016/0371319 A1 | 12/2016 | Park et al. |
| 2016/0371356 A1 | 12/2016 | Lee et al. |
| 2016/0371357 A1 | 12/2016 | Park et al. |
| 2016/0371358 A1 | 12/2016 | Lee et al. |
| 2016/0378813 A1 | 12/2016 | Yoon et al. |
| 2016/0378826 A1 | 12/2016 | Bensberg et al. |
| 2017/0004158 A1 | 1/2017 | Faerber et al. |
| 2017/0004177 A1 | 1/2017 | Faerber et al. |
| 2017/0068608 A1 | 3/2017 | Covell et al. |
| 2017/0083538 A1 | 3/2017 | Tonder et al. |
| 2017/0097977 A1 | 4/2017 | Yoon et al. |
| 2017/0123877 A1 | 5/2017 | Gonglooer et al. |
| 2017/0147628 A1 | 5/2017 | Park et al. |
| 2017/0147639 A1 | 5/2017 | Lee et al. |
| 2017/0147644 A1 | 5/2017 | Lee et al. |
| 2017/0147645 A1 | 5/2017 | Song et al. |
| 2017/0147646 A1 | 5/2017 | Lee et al. |
| 2017/0147671 A1 | 5/2017 | Bensberg et al. |
| 2017/0177658 A1 | 6/2017 | Lee et al. |
| 2017/0177697 A1 | 6/2017 | Lee et al. |
| 2017/0177698 A1 | 6/2017 | Lee et al. |

(56) References Cited

U.S. PATENT DOCUMENTS

| | | | |
|---|---|---|---|
| 2017/0185642 | A1 | 6/2017 | Faerber et al. |
| 2017/0322972 | A1 | 11/2017 | Lee et al. |
| 2017/0329835 | A1 | 11/2017 | Lee et al. |
| 2017/0351718 | A1 | 12/2017 | Faerber et al. |
| 2017/0357575 | A1 | 12/2017 | Lee et al. |
| 2017/0357576 | A1 | 12/2017 | Lee et al. |
| 2017/0357577 | A1 | 12/2017 | Lee et al. |
| 2018/0013692 | A1 | 1/2018 | Park et al. |
| 2018/0074919 | A1 | 3/2018 | Lee et al. |
| 2018/0075083 | A1 | 3/2018 | Lee et al. |

OTHER PUBLICATIONS

"Database SQL Language Reference. Types of SQL Statements," retrieved from https://docs.oracle.com/cd/B19306_01/server.102/b14200/statements_1001.htm, on or before Apr. 18, 2016, 4 pages.
"Explain Plan," retrieved from https://help.sap.com/viewer/4fe29514fd584807ac9f2a04f6754767/2.0.00/en-US/20d9ec5575191014a251e58ecf90997a.html, on Apr. 18, 2016, 5 pages.
"Oracle Database 11g: The Top New Features for DBAs and Developers—Database Replay," retrieved from http://www.oracle.com/technetwork/articles/sql/11g-replay-099279.html on Apr. 22, 2016, 11 pages.
"Performance Trace Options," retrieved from https://help.sap.com/doc/bed8c 14f9f024763b0777aa72b5436f6/2.0.00/en-US/80dcc904a81547a69a7e7105f77e0e91.html, on Apr. 18, 2016, 1 page.
"Relay Server logging and SAP Passports," retrieved from http://dcx.sybase.com/sa160/fr/relayserver/rs-sap-passport-support.html, on Apr. 18, 2016, 1 page.
"SAP Cloud Computing," retrieved from http://computing1501.rssing.com/chan-8466524/all_p7.html, on Apr. 12, 2016, 67 pages.
"SAP Controls Technology Part 3," retrieved from http://www.itpsap.com/blog/2012/06/23/sap-controls-technology-part-3/, on Apr. 18, 2016, 4 pages.
"SAP HANA SPS 09—What's New?," retrieved from https://www.slideshare.net/SAPTechnology/sap-hana-sps-09-smart-data-streaming, Nov. 2014, 44 pages.
"SQL Statements in SAP HANA," retrieved from http://sapstudent.com/hana/sql- statements-in-sap-hana, on Apr. 18, 2016, 3 pages.
"Stop and Start a Database Service," retrieved from https://help.sap.com/doc/6b94445c94ae495c83a19646e7c3fd56/2.0.00/en-US/c13db243bb571014bd35a3f2f6718916.html, on Apr. 18, 2016, 2 pages.
"Week 5 Unit 1: Server-Side JavaScript (XSJS)" retrieved from https://www.scribd.com/document/277530934/Week-05-Exposing-and-Consuming- Data-With-Server-Side-JavaScript-Presentation, on Apr. 18, 2016, 29 pages.
Binnig, et al., "Distributed Snapshot Isolation: Global Transactions Pay Globally, Local Transactions Pay Locally," *VLDB J.*, 23(6):987-1011 (2014).
Cha et al., "An Extensible Architecture for Main-Memory Real-Time Storage Systems," *RTCSA*, pp. 67-73 (1996).
Cha et al., "An Object-Oriented Model for FMS Control," *J. Intelligent Manufacturing*, 7(5): 387-391 (1996).
Cha et al., "Cache-Conscious Concurrency Control of Main-Memory Indexes on Shared-Memory Multiprocessor Systems," *VLDB*, pp. 181-190 (2001).
Cha et al., "Efficient Web-Based Access to Multiple Geographic Databases Through Automatically Generated Wrappers," *WISE*, pp. 34-41 (2000).
Cha et al., "Interval Disaggregate: A New Operator for Business Planning," *PVLDB*, 7(13):1381-1392 (2014).
Cha et al., "Kaleidoscope Data Model for An English-like Query Language," *VLDB*, pp. 351-361 (1991).
Cha et al., "Kaleidoscope: A Cooperative Menu-Guided Query Interface," *SIGMOD Conference*, pp. 387 (1990).
Cha et al., "Meadow: A Middleware for Efficient Access to Multiple Geographic Databases Through OpenGIS Wrappers," *Softw. Pract. Exper.*, 32(4):377-402 (2002).
Cha et al., "Object-Oriented Design of Main-Memory DBMS for Real-Time Applications," *RTCSA*, pp. 109-115 (1995).
Cha et al., "P*Time: Highly Scalable OLTP DBMS for Managing Update-Intensive Stream Workload," *VLDB*, pp. 1033-1044 (2004).
Cha et al., "Paradigm Shift to New DBMS Architectures: Research Issues and Market Needs," *ICDE*, pp. 1140 (2005).
Cha et al., "Xmas: An Extensible Main-Memory Storage System," *CIKM*, pp. 356-362 (1997).
Colle, et al., "Oracle Database Replay," retrieved from http://www.vldb.org/pvldb/2/vldb09-588.pdf, on or before Sep. 2017, 4 pages.
Dasari, "Modify Parameters to Optimize HANA universe," retrieved from https://blogs.sap.com/2014/05/03/modify-parameters-to-optimize-hana-universe/, on Apr. 15, 2016, 2 pages.
Farber et al., "SAP HANA Database—Data Management for Modern Business Applications," *SIGMOD Record*, 40(4):45-51 (2011).
Hwang et al., "Performance Evaluation of Main-Memory R-tree Variants," *SSTD*, pp. 10-27 (2003).
Kim et al., "Optimizing Multidimensional Index Trees for Main Memory Access," SIGMOD *Conference*, pp. 139-150 (2001).
Lee et al., "A Performance Anomaly Detection and Analysis Framework for DBMS Development," *IEEE Trans. Knowl. Data Eng.*, 24(8):1345-1360 (2012).
Lee et al., "Differential Logging: A Commutative and Associative Logging Scheme for Highly Parallel Main Memory Databases," *ICDE*, pp. 173-182 (2001).
Lee et al., "High-Performance Transaction Processing in SAP HANA," *IEEE Data Eng. Bull.*, 36(2):28-33 (2013).
Lee et al., "SAP HANA Distributed In-Memory Database System: Transaction, Session, and Metadata Management," *ICDE*, pp. 1165-1173 (2013).
Park et al., "Xmas: An Extensible Main-Memory Storage System for High-Performance Applications," SIGMOD Conference, pp. 578-580 (1998).
Sikka et al., "Efficient Transaction Processing in SAP HANA Database: The End of a Column Store Myth," SIGMOD Conference, pp. 731-742 (2012).
Yoo et al., "A Middleware Implementation of Active Rules for ODEMS," *DASFAA*, pp. 347-354 (1999).
Yoo et al., "Integrity Maintenance in a Heterogeneous Engineering Database Environment," *Data Knowl. Eng.*, 21(3):347-363 (1997).

\* cited by examiner

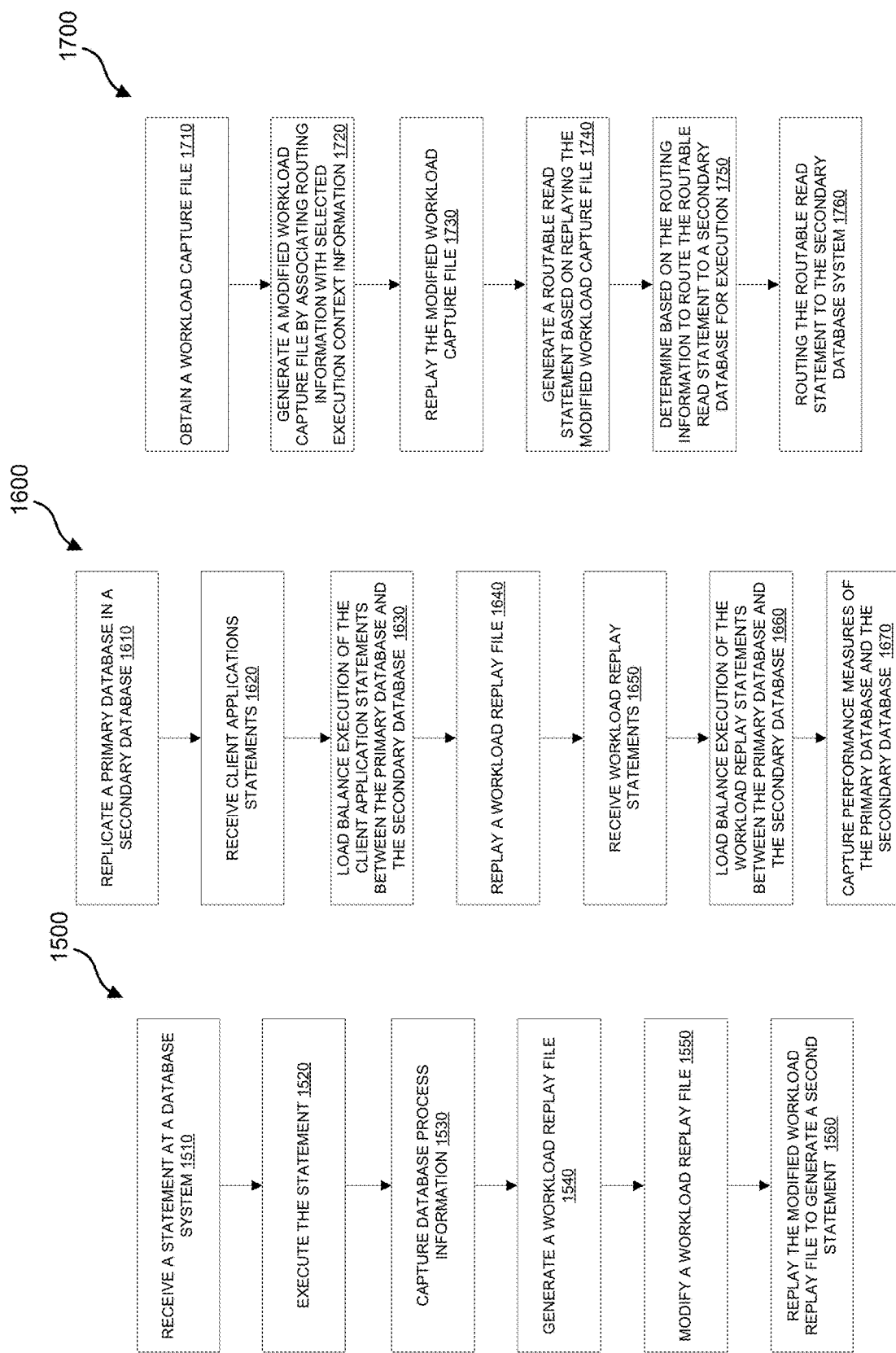

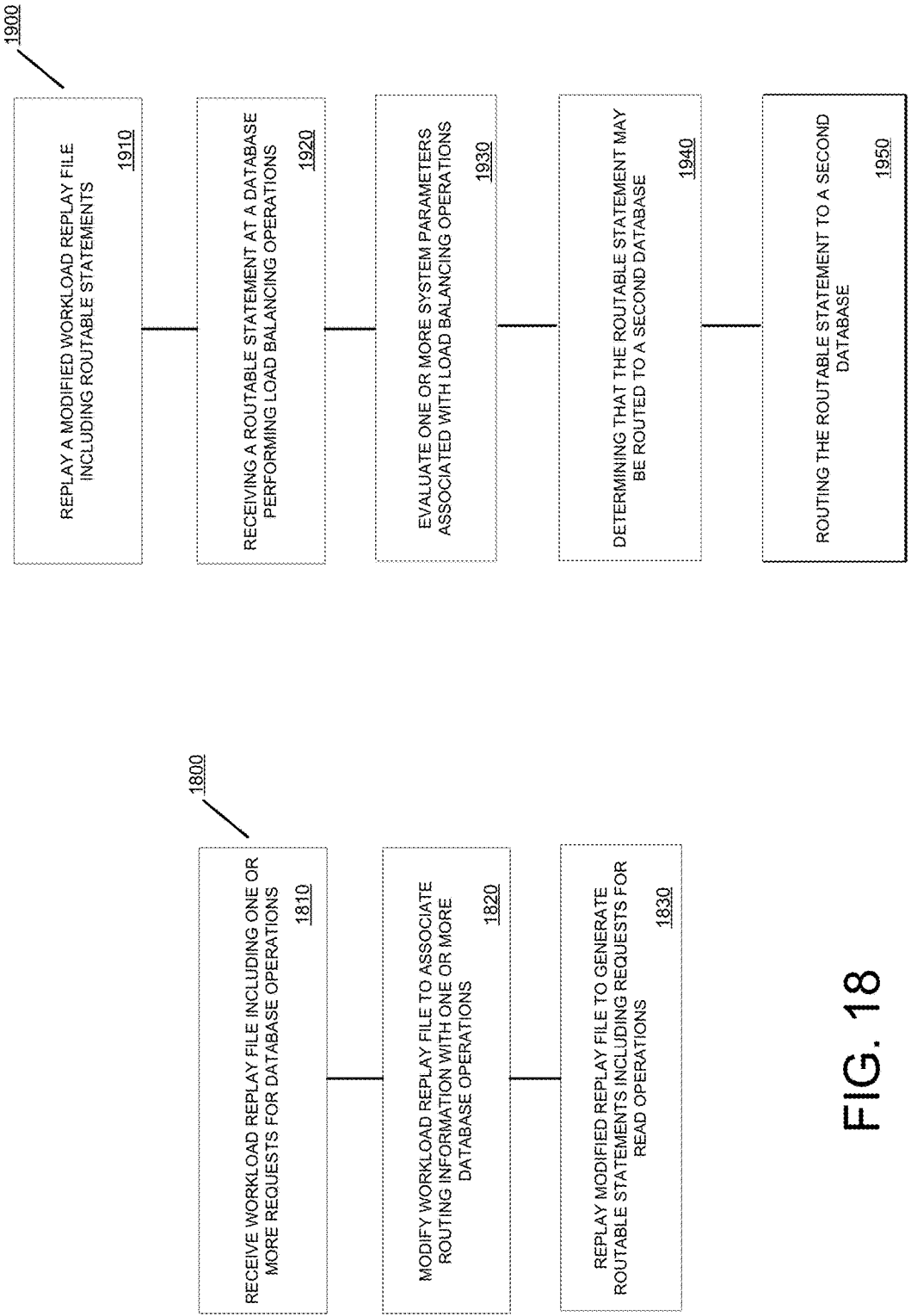

WORKLOAD CAPTURE AND REPLAY FOR REPLICATED DATABASE SYSTEMS

TECHNICAL FIELD

The subject matter described herein relates to database systems and more particularly to database systems employing a primary database and a secondary, hot-standby, database.

BACKGROUND

A database system includes a database and a database management system (DBMS). A database is an organized collection of data. A DBMS comprises computer software that executes on one or more processors and interacts with users, other applications, and a database to capture and analyze data. A DBMS may allow for the definition, creation, querying, update, and administration of databases.

Database systems rely on data replication and synchronization to maintain continuous system availability. Typically, in such a system, a complete copy of the database is stored at a first datacenter and the same complete copy of the database is stored at a second datacenter. The first and second datacenters may be in different locations or they may be in the same location. Since the data in the second datacenter needs to be the same as the data in the first datacenter, a synchronization mechanism is typically employed to handle synchronization of the data. If there is a failure associated with the first datacenter, the system can switch to using the database at the second datacenter without significant issues.

Since the second datacenter may be asked to perform all of the same tasks as the first datacenter, typically, the second datacenter has the same hardware and software requirements as the first datacenter. Sometimes more than two datacenters may be included within a database.

SUMMARY

In a first aspect, a workload capture file is obtained that contains execution context information generated based on execution of read statements and write statements in a database system. The workload capture file is a replayable file, that can be replayed by a computer processor in order to recreate and issue read statements and write statements based on execution context information contained in a replayable file. Subsequently, a modified workload capture file is created by generating modified execution context information by associating routing information with read execution context information associated with read statements embodied in an obtained workload capture file, and replaying a modified workload capture file thereby generating a routable read statement. A generated routable read statement is later issued to a primary database system having an associated secondary database system. If it is determined, based on the routing information, that a routable read statement may be routed to a secondary database system for execution, a routable read statement is routed to the secondary database system for execution.

A routable read statement can be executed, upon receipt, by the secondary database system. Where a secondary database is configured to replicate a primary database system by transaction log replay, determining that a routable read statement may be routed to the secondary database system for execution can further include determining, upon receiving a routable read statement by a primary database system, that a routable read statement has associated routing information, and can then further include evaluating parameter(s) associated with transaction log replay to determine, based on routing information and parameter(s), that at least one routable read statement may be executed in the second database. The one or more parameter(s) associated with transaction log replay can be indicative of a delay between a current primary database system time and when a transaction log is replayed in a secondary database system. A database system generating execution context information can be a primary database system, a secondary database system, or a tertiary database system that is separate and distinct from a primary database and a secondary database.

A plurality of performance measures associated with replaying a modified workload capture file can be generated. When a workload capture file comprises a plurality of past performance measures associated with an execution of read statements and write statements in a database system, a report based on the performance measures or the past performance measures may also be generated. Replaying a modified capture file, collecting performance measures, or compiling a report may each occur at a computer system separate and distinct from a primary database system or a secondary database system.

In an interrelated aspect, a read query request originating from a workload replayer configured to replay a workload capture file is received by a primary database system that is associated with a standby database system that is capable of executing read queries intended for a primary database system. A replay capture file includes database operation information associated with previously executed queries and that was subsequently modified to include test query routing information. Query routing information indicates that an associated read query request may be executed by the standby database system. Subsequently, upon receiving the read query request, a determination is made that the read query request includes test query routing information. And, based on the query routing information and a system parameter(s) related to the current state of a standby database system or the state of a primary database system a subsequent determination is generated generating to route the read query request to a standby database system for execution. Then, the read query is routed to the standby database for execution.

In another interrelated aspect, a plurality of database operations are captured. The database operations are responsive to one or more requests for database operations in a workload replay file that is capable of being replayed to recreate new requests based on the captured requests. The captured requests are modified by associating routing information with the captured database operations. When a primary database system and the secondary database system are in a load balancing and a modified workload replay file is replayed, routing information associated with a new request for database operations indicates that the request is routable to a secondary database system for execution.

A workload replay file can be replayed to issue a new request to a primary database system or a secondary database system. Routing information can also include a condition that must be met before a new request for database operations may be routed to a secondary database system. Conditions can require that a lag between a primary database system and a second database system not exceed a threshold. The lag can be based on a system clock of a primary database system and a most recent commit timestamp of a secondary database system. When replicating primary database operations in a secondary database system, a most recent commit timestamp can be associated with a most recently committed database operation in a secondary database system. A workload replay file may also include sufficient information to recreate captured requests for database operations. A workload replay file may also include context information stored in multidimensional schema. Capturing database operations of a database system responsive to requests for database operations can include capturing performance measures relating to a number to database operations, such as: updating an in-memory database; generating transaction logs; storing the transaction logs in a persistent state; shipping the transaction logs to a replica database; replaying the transaction logs at the replica database; updating a second in-memory database of the replica database; and executing routable statements on the second in-memory database.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. As an example, the subject matter described herein may assist in testing database operations by generating increased average throughput for a database system to simulate high workloads. This can assist a system designer in tailoring a system to enabling effective load balancing techniques for balancing the workload of a primary system with a backup database system. The subject matter described herein allows testing of a database system by capturing real time database operations responsive to client applications during production operations. These captured database operations constitute a captured workload which may be analyzed, modified, and replayed to simulate a workload at a later time, in the same database, or in another database system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 15 is a process flow diagram illustrating generating a workload by replaying a modified workload capture file in a database system;

FIG. 16 is a process flow diagram illustrating capturing performance measures during replay of a modified workload capture file in a database system performing load balancing and replication operations;

FIG. 17 is a process flow diagram illustrating hint based routing of statements generated by replaying a modified workload capture file in a redundant database system;

FIG. 18 is a process flow diagram illustrating generating routable read statements by modifying and replaying workload capture file by a computer system; and FIG. 19 is a process flow diagram illustrating hint based routing of statements generated by replaying a modified workload capture file in a redundant database system.

Like reference symbols in the various drawings indicate like elements.

DETAILED DESCRIPTION

Figure 1:
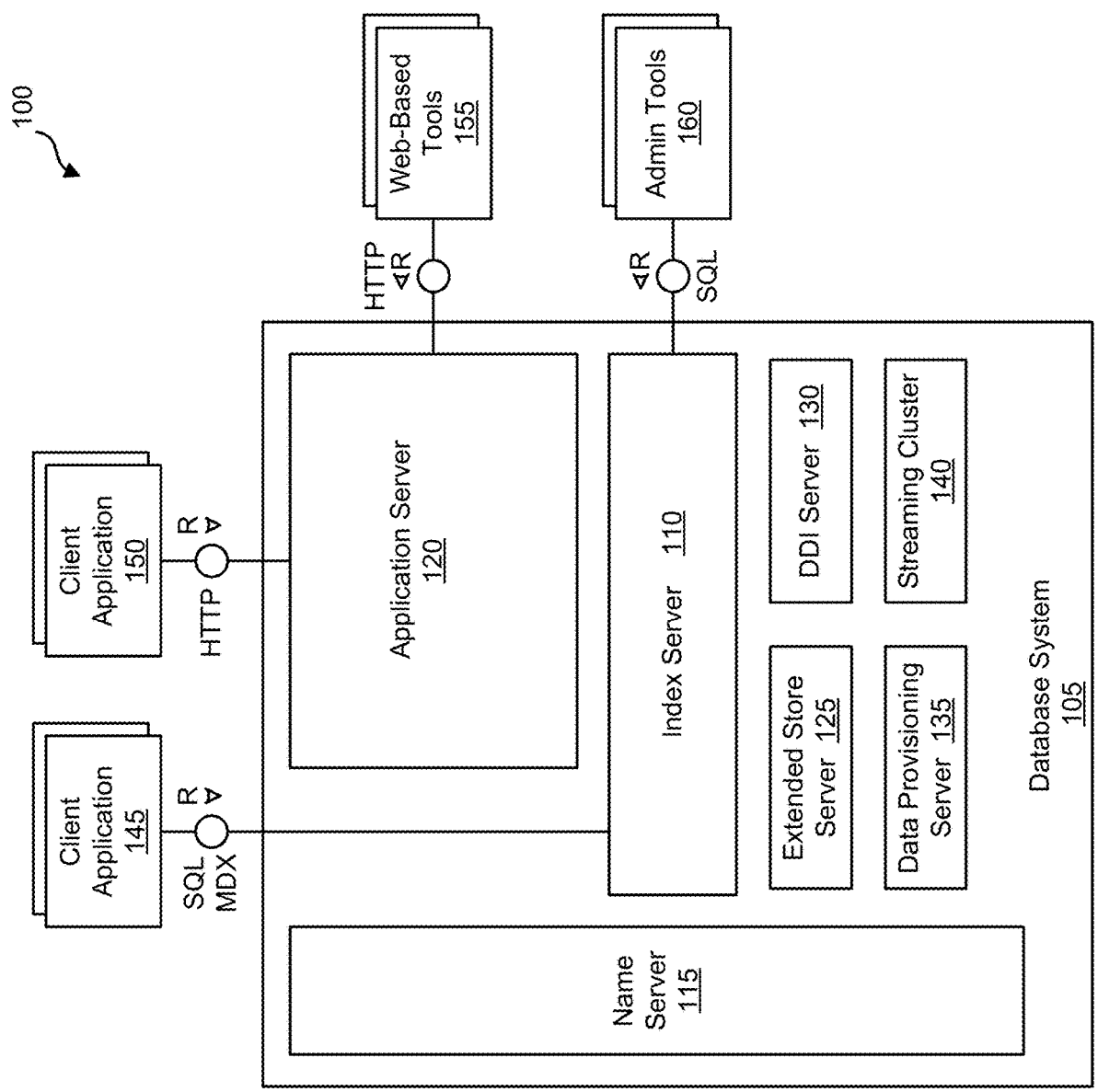
FIG. 1 is a system diagram illustrating an example database system for use in connection with the current subject matter.

The current subject matter is directed to enhanced techniques for managing a workload load balancing scheme when mirroring a primary database system in a backup database system, for example when such load balancing is executed concurrently with replay of database operations using, for example, a redo log.

A database or database system may be represented as a table or a set of tables, the tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in-memory database (IMDB) in which the data associated with the database is stored in main memory instead of disk storage so it may be accessed more quickly. IMDB systems are generally column oriented databases since column oriented databases make more efficient use of the expensive main memory.

Some databases may utilize replication to improve reliability and availability of the database. If data replication is implemented, the database system may include a first datacenter and a second datacenter. The first datacenter may include a processor and memory sufficient to store the data associated with the database. The first datacenter may store a first (primary) copy of the data associated with the database. The second datacenter may also include a processor and memory sufficient to store the data associated with the database. The second datacenter may store a second (e.g., backup or redundant or replica) copy of the data associated with the database. In some implementations, the database may include more than two datacenters (e.g., three or four datacenters). In some implementations, either one or both of the databases is a distributed system or a single server system.

To better utilize the second (and subsequent) datacenter(s), some database systems, such as SAP HANA®, may simultaneously utilize the first datacenter and the second datacenter. In this mode of operation, the first datacenter may be configured to delegate, or route, queries to the second datacenter to balance the workload between the two systems. Such a situation may be referred to as Active/Active (AA) operation since the first datacenter and the second datacenter both actively respond to queries, or statements, at the same time by executing database operations responsive to the queries, or statements, in order to provide a response, or return. In some implementations only certain types of queries, or statements, may be responded to, or alternatively executed, by the first datacenter or the second datacenter.

In some implementations such balancing may only occur when conditions of the first datacenter and the second datacenter are satisfied. The second data center may replicate the first database of the first database center in a second database of the second data center, and load balancing may only occur when a time delay between the two data centers is sufficiently small, or when a delay in the replication processes at the second datacenter is sufficiently small. In some implementations, the replication processes may take priority over the ability of one or more datacenters to support the load balancing operations.

When two or more datacenters or two or more database systems are engaged in load balancing operations, a client application, reliant on a database maintained by the first database system and replicated in the second database system, may restrict execution of queries to either the first database system or the second database system. In such a system, the client application may modify a query, or package a query, with additional routing information identifying which database may execute the query and under what conditions.

In some embodiments the client may dispatch or issue or transmit its queries directly to the database system it wants to obtain a response or return from. In other embodiments one or more processes at the client application, the first database system, or the second database system inform the client application which system will execute the statement or query. In other embodiments, the client application always issues its statements or queries to the first database system. The first database system includes various processes, in a standalone server or in a server providing other database services, that support the load balancing operations by maintaining state data, or having access to such state data, and making determinations as to whether the statement will be executed in the first database system or the second database system. If the load balancing processes determine that a statement may be executed by the second database system, a statement is routed back to the client application with an indication that a statement is to be executed in the database of second database system, that may be a backup or replica of the database of the first database system. Then the client application issues the query to the second database system for execution, and such execution can be contingent upon certain conditions, such as for example a delay between when a transaction is visible in the primary database system and when the same transaction is replicated and subsequently visible in the secondary database which may be an asynchronously replicated near mirror image of the primary database system, or source database. If execution in the secondary database fails, the query may be routed back to the client of the primary database based on fall back procedures.

The subject matter described herein discloses apparatus, systems, techniques and articles that may provide increased average throughput capabilities for a database system during high workloads to reduce the likelihood that a request to the database system for data may be queued, buffered or rejected until sufficient system resources are available to complete the request. In some examples, apparatus, systems, techniques and articles disclosed herein utilize secondary, backup, or replicated, database systems to execute queries to reduce the workload of a primary database system, while ensuring that the database systems return accurate and relevant results. When a query may be routed from a primary database to a secondary database, if the second database system's state falls behind the current state of the primary database system by a significant amount, a return provided by the secondary database may be inaccurate or irrelevant by returning outdated data. A secondary database system's state may fall behind a primary system's state, for example, when the replication processes is unable to maintain pace with ongoing primary system updates. Thus, in some cases, a system designer or maintainer may want to subject a system to stress tests including simulated workloads.

When a secondary, or backup, database system serves the purpose of HA/DR functionality, an apparatus, system, technique or article that utilizes a secondary, backup database system to increase throughput of a workload on a primary database system must not interfere with the HA/DR functionality of the backup system. The use of the backup database system to increase throughput must also maintain the backup database in substantially the same state as the primary database. In the event of primary database system failure, the backup database can assume the role of the primary database in as little time as possible. Therefore, transactions replicated, or mirrored, to the secondary database must be as close to current as possible.

In a system that mirrors a primary database in a secondary database by transaction log reply, generation of and subsequent replay of transaction logs may not be able to keep pace with real time data transactions in a database system. Under heavy write-intensive workloads, replay of transactions executed in the primary by replay of transaction logs may be optimized by one or more techniques to minimize any delay, for example, transaction replication may be performed by various threads asynchronously operating on distinct dedicated logical cores of a multi-core processor. Because the replication processes execute asynchronously, there is no guarantee that updates to the primary database will be replicated in the same order as they are executed in the primary database system. In order to provide meaningful and useful workload support, a secondary system must be able to provide temporally consistent view into the data of the replicated database.

One possible way of providing transactionally consistent views in a replicated database is by maintaining a global commit timestamp in the replicated database, which establishes the visibility of all transactions, by making visible all transactions committed in the replicated database before the global commit timestamp and making invisible all transactions not yet committed as of the global commit timestamp. The global commit timestamp may be associated with the most recently committed transaction in the replicated database system. As long as the secondary database presents consistent views into the data, it is acceptable that the replication may be slightly delayed. Determining what is an acceptable delay is left to a particular application designer.

Therefore, it is desirable to test database operations from time to time under simulated conditions to measure the performance of the various components of a database system, for example a replicated database system performing load balancing of database operations with its replicated counterpart. Also, in test situations in order test the functionality and usefulness of load balancing, simulated statements routed to the backup database system that encounter a substantial delay between the data visibility, or the snapshot, of the secondary database system and its primary database system, or any other related conditions detrimental to useful operations, should be routed back to the client application or to the primary database system with an indication that the statement was not executed due to the snapshot delay.

FIG. 1 is a diagram 100 illustrating a database system 105 that can be used to implement aspects of the current subject matter. The database system 105 can, for example, include an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
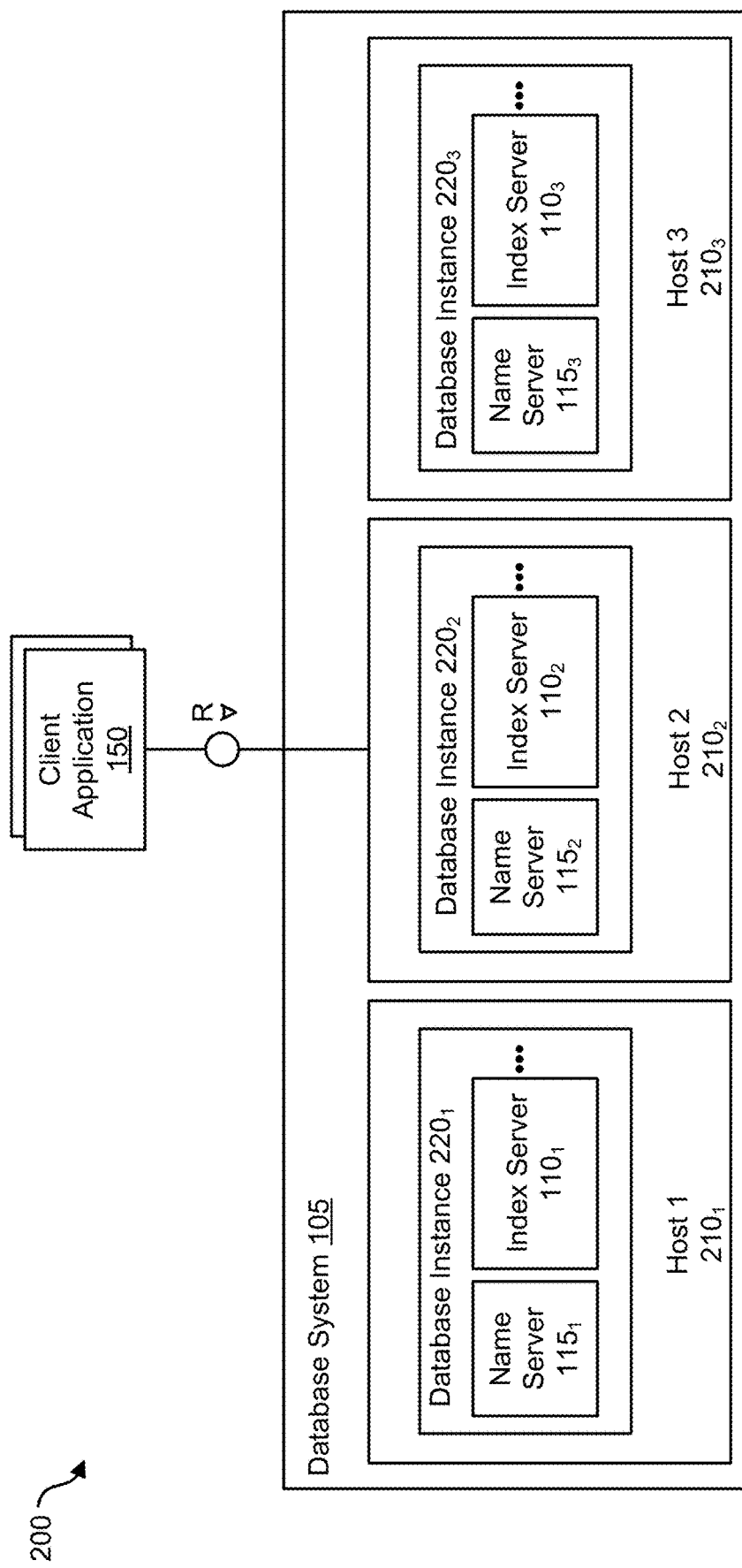
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
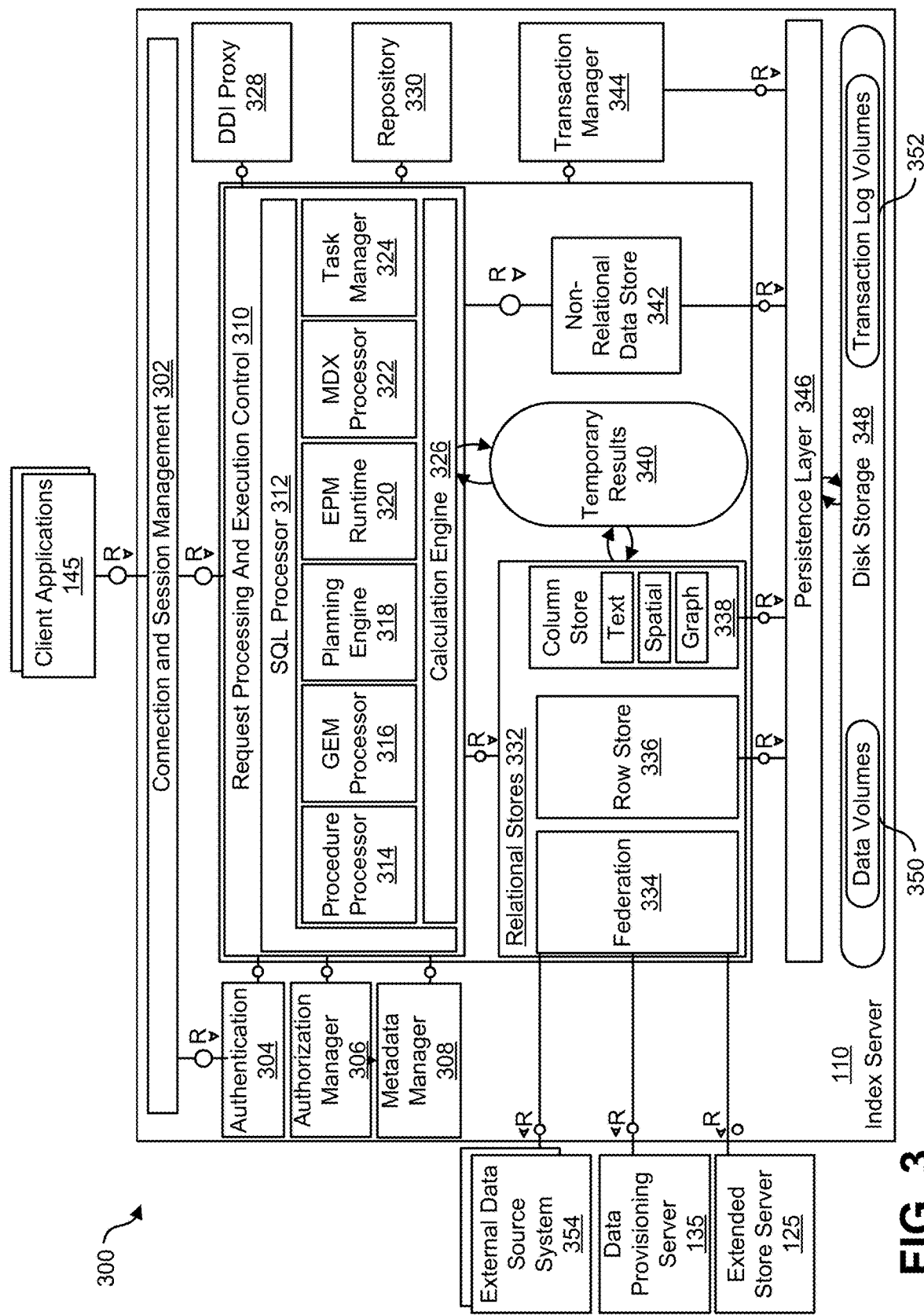
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 150. For each session, a set of parameters can be maintained such as, for example, auto commit settings or the current transaction isolation level.

Requests from the client applications 150 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 150 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 150 using the same network communication protocol. GEM statements can be sent using a built-in SQL system procedure.

The index server 110 can include an authentication component 304 that can be invoked with a new connection with a client application 150 is established. Users can be authenticated either by the database system 105 itself (login with user and password) or authentication can be delegated to an external authentication provider. An authorization manager 306 can be invoked by other components of the database system 150 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 150 can be e received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework). Incoming MDX requests can be delegated to the MDX processor 322. Procedure calls can be forwarded to the procedure processor 314, which further dispatch the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system (s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written in the persistence layer 352 (e.g., in transaction log volumes 352) explicitly by using a log interface or implicitly when using the virtual file abstraction. The transaction log volume 352 can include redo logs which specify database operations to be replayed as well as undo logs which specify database operations to be undone.

The persistence layer 236 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

In many applications, data systems may be required to support operations on a 24/7 schedule, and data system providers may be required to guarantee a maximum amount of downtime, that is time during which a system is not able to fully support ongoing operations. When a system is required to ensure an agreed level of operational performance, it may be referred to as a high availability system ("HA"). One solution to guarantee substantially continuous uptime with no, or very little, downtime is to maintain one or more hot-standby systems. A hot-standby system, or a backup system, is a system that may be activated quickly in the event of a disruption causing one or more functions of a primary operational data system to fail. Such a disruption may be referred to as a disaster, and the process of restoring a data system to full operations may be referred to as disaster-recovery ("DR").

A hot-standby system may be an exact replica of a primary operational system that is capable of providing all the functions provided by the primary operational system, or a hot-standby may be a system that is capable of providing a minimum amount of essential functionality during the time required to restore the primary operational data system. The time it takes after a disaster to restore full, or minimum, functionality of a data system, for example by bringing a hot-standby online, is referred to as recovery time. In an effort to minimize recovery time, and thereby downtime, a hot-standby system is typically in a state just short of fully operational. For example, a system architecture may be implemented in which all functional systems of the hot-standby are active and operational, and all system and data changes or updates occur in the primary operational system and the hot-standby at the exact same time. In such a case the only difference in the two systems may be that the primary is configured to respond to user requests and the secondary is not. In other hot-standby systems one or more functions may be disabled until mission critical systems of the hot-standby are observed to be operating normally, at which time the remaining functions may be brought online.

In many applications, data systems may be required to provide prompt responses to users and applications that rely on the data managed by the data system. Providers and designers of data systems may be required to guarantee a minimum average throughput over time, or an average maximum response time. The speed with which a data system responds to a request from a user or an application may be dependent on many factors, but all systems are limited in the number of requests they can handle in a given period of time. When a data system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing and HA systems is that they may require additional processing systems, which in turn have a high cost. It is often the case with certain data systems supporting critical functions of an organization that additional systems are needed to perform both load balancing and HA functionality to efficiently support continuous operations. Given the redundant nature of DR systems, they are often left undisturbed unless a disaster occurs. Thus, in some circumstances, it is desirable to implement and maintain a combination high availability/disaster recovery (HA/DR) system with load balancing that includes both a primary operational system and a hot-standby system, and potentially one or more tertiary systems. Such a combination system allows for load balancing of workload between the processing systems of both the primary operational system and the hot-standby system, without disrupting the ability of the HA/DR system to assume primary functionality in the event of a disaster.

Figure 4:
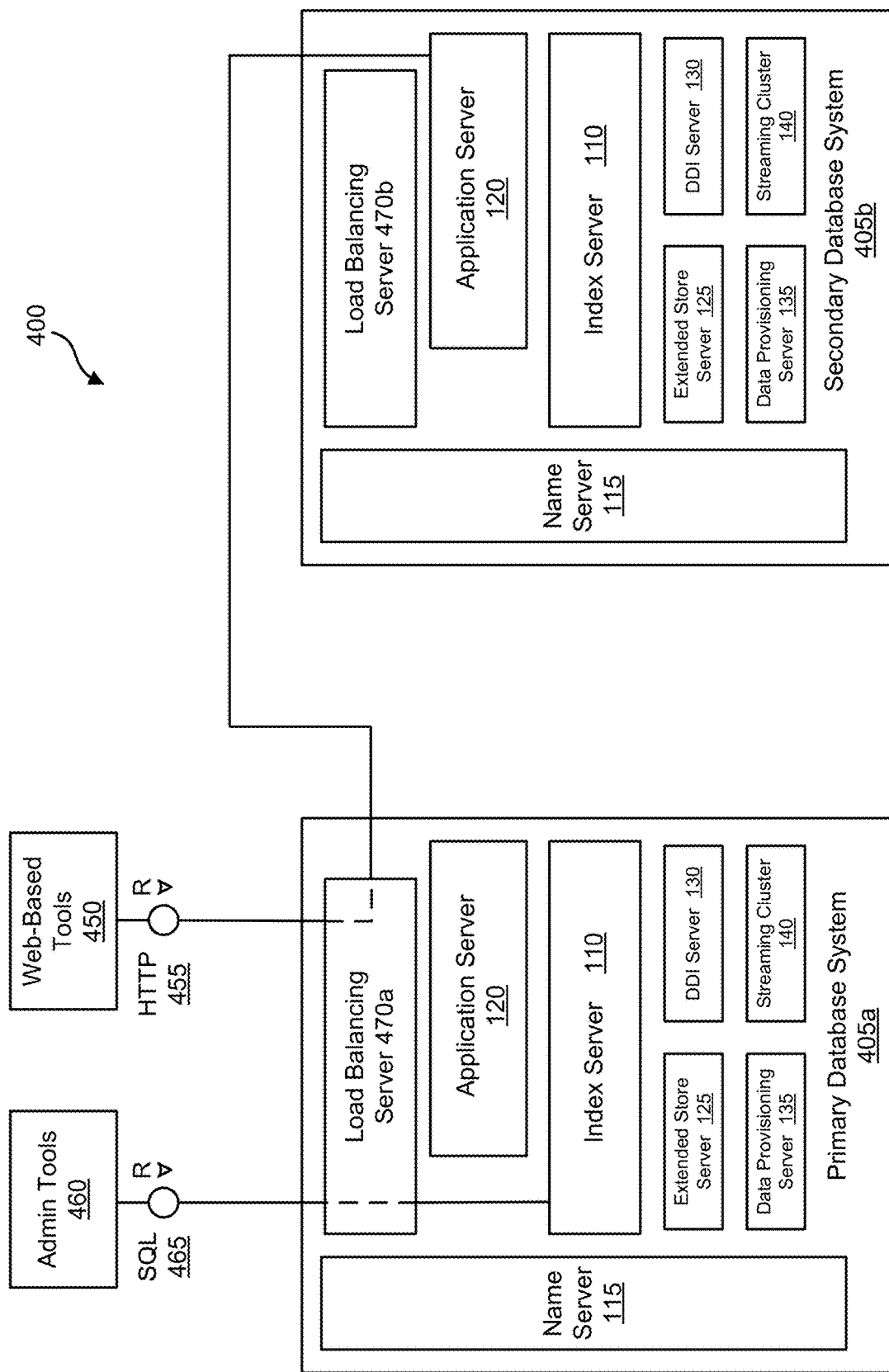
FIG. 4 is a functional flow diagram illustrating an architecture to support load balancing between a primary database system and a secondary database system.

FIG. 4 is a functional flow diagram illustrating an architecture 400 to support load balancing between a primary database system, or primary system 405a and a secondary database system, or secondary system 405b, which serves as hot-standby to primary system 405a. Each of the primary system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405a and secondary system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary system 405a, sending requests to the secondary system 405b as necessary to maintain a well distributed workload. The various load balancing processes operating in server 470a or 470b may be components of a larger DBMS system for managing the primary system 405a and secondary system 405b.

As depicted in FIG. 4, each of the primary system 405a and the secondary system 405b includes a load balancing server 470a and 470b which respectively receive requests from user applications directed to the primary system 405a or the secondary system 405b. Such request may come from either admin tools 460 or web-based tools 450, or any other user application. Upon receiving a request a load balancing server, e.g. 470a, determines how to distribute the workload. As depicted load balancing server 470a routes an SQL request 465 from admin tools 460 to the index server 110 of the primary system 405a, while routing an HTTP request 455 from web-based tools 450 to the application server 120 of the secondary system 405b.

Load balancing of resources between a primary system 405a and a secondary system 405b can give rise to a number of complicating issues. For example, if either of the requests 455, 465 requires writing to one or more data tables, or modifying a data table, then the two systems 405a, 405b will diverge. After many instances of write requests being distributed between the primary system 405a and the secondary system 405b, the two systems would be substantially different, and likely unusable. In another example, an application request, e.g. 465, may perform a write transaction that is followed by a read transaction, e.g. 455, related to the data written by the write request 465. If the write request is allocated to the primary system 405a, the read request would obtain a different result depending on whether the subsequent read transaction is carried out by the primary system 405a or by the secondary system 405b.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system must maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
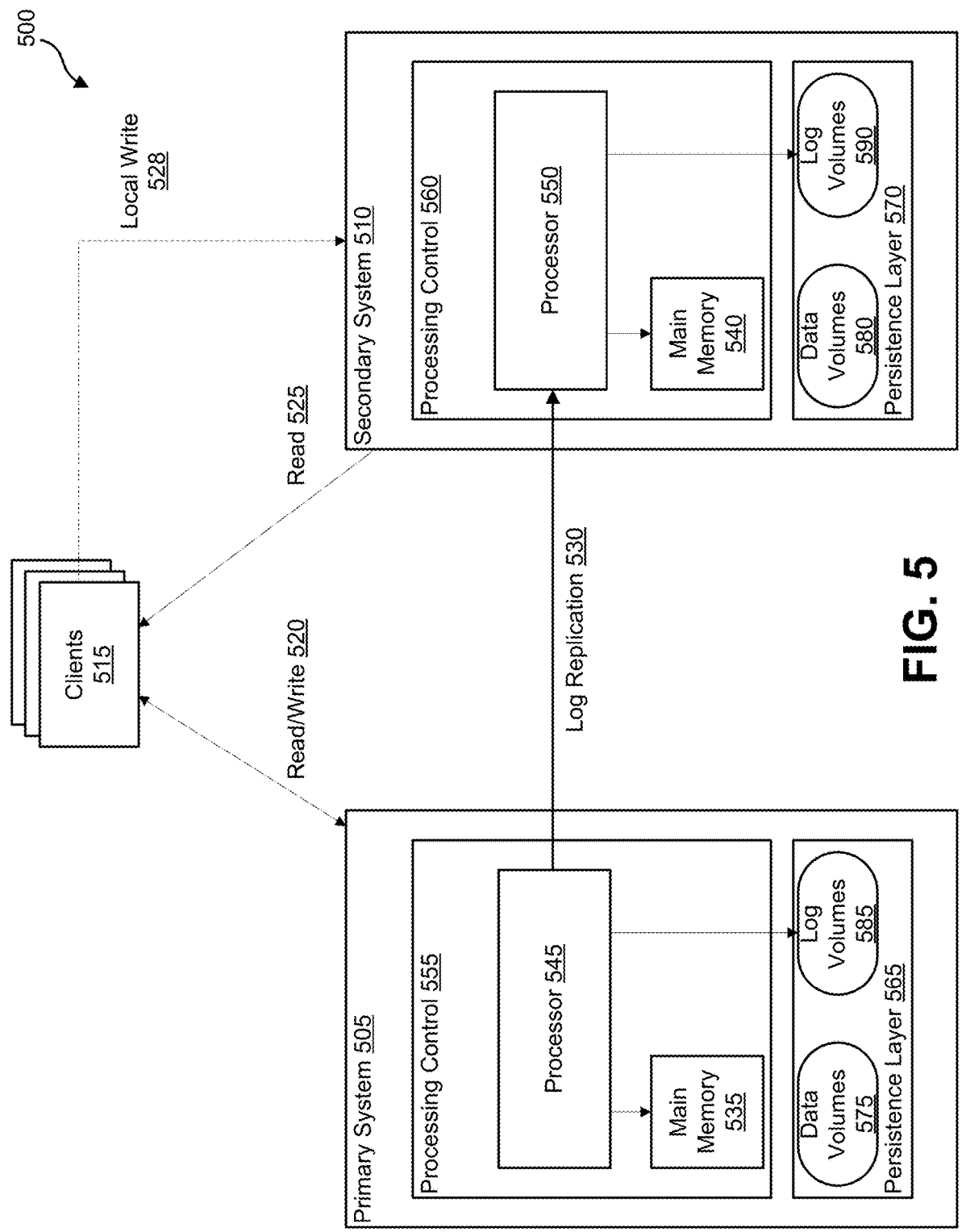
FIG. 5 is a functional flow diagram depicting one example solution to managing load balancing in a HA/DR system for use in connection with the current subject matter.

FIG. 5 depicts one possible solution to managing load balancing in a HA/DR system 500. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510. These various components may comprise a DBMS system for controlling the HA/DR system 500 and constitute various processes and components executing within processing control 555, 560 and the persistence layer 565, 570. The DBMS system therefore interacts with and maintains the database as it is held in main memory 535, 540 and persisted in the persistence layer 565, 570.

A collection of clients may each maintain an open connection to both the primary system 505 and the secondary system 525. Clients 515 may interact with a database managed by the primary system 505 or the secondary system 510. Such clients may interact through client applications or through components of the DBMS system executing at the client 515. In other cases, the clients may rely on a client application library containing various processes and techniques for interacting with the database systems. For example, a client 515 maintains a read/write connection for issuing read and write statements 520 to the primary system 505 and a read only connection for issuing read statements 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. In embodiments read/write statements 520 are issued to the primary database system 505, while only read statements 525 are issued to the backup, or secondary, database system 510.

In embodiments, load balancing of the workload required by a client application executing at client 515 is managed by the client 515 application itself. Alternatively, a client 515 application may submit a query request to either the primary system 505 or the secondary system 510 with routing data indicating that the statement may be load balanced, or routed to the secondary database system 505, and including one or more routing conditions. Process control 555, 560 load balancing processes executing on processor 545, 550 may then determine where the query should be executed and replies to the client 515 with instructions identifying which system the client 515 should issue the query to. This determination may consider various conditions related, among other things, to the state of a primary database system 505 or a state of the secondary database system 510. For example, the determination may consider a delay between the current transactions executing in the primary system and the secondary system caused by the time required to replicate transactions of the primary system in the secondary system.

Primary system 505 may include an in-memory database in which substantially all actively used data may be kept and maintained in main memory 535 so that operations can be executed without disk I/O, which requires accessing disk storage. As statements are execute the in-memory database is updated by various database operations caused by the statement. In embodiments, these database operations also generate transaction logs which are shipped to the secondary system 510 for replication 530 in the secondary database system 510. During replication the secondary database system 510 mirrors the primary database system 505. In embodiments, applications that rely on the primary database system 505 may allow for transactions to be executed in the replicated or mirror database at the secondary database system 510. These applications may impose conditions on when a requested transaction can be routed to a secondary database 510. This routing may occur when the primary database system 510 is engaged in load balancing of a workload between the primary system 505 and the secondary system 510. One potential condition may be that the statement may only be routed to or executed in the secondary database system when a delay in time between the current operations in the primary system 505 and the replication of the primary system in the secondary system 510 is below a threshold.

In embodiments, primary system 505 may be the primary operational system for providing the various functionality necessary to support 24/7 operations for an organization. Secondary system 510 may be a hot-standby, ready to come online with minimal recovery time so as to minimize downtime. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

In embodiments, primary system 505 and secondary system 510 differ in that all requests, from client 515 or otherwise, that require a write transaction are executed only in primary system 505. Primary system 505 and secondary system 510 further differ in that all write transactions are prohibited by the secondary system 510. In order to propagate changes to the data or the underlying schema from the primary system 505 to the secondary system 510, processor 545 also replicates 530 transaction logs directly to the process control 560 of the secondary system 510. Process control 560 includes processes that cause processor 550 to then replay the transaction logs replicated from the primary system 505, thereby replicating or mirroring the transactions or data at the secondary system 510. As transaction logs are replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in transaction logs being persisted in log volumes 590.

Transaction logs (e.g., redo logs, undo logs, cleanup logs, commit logs, savepoint logs, heartbeat logs, etc.) may be replicated 530 in different ways. In embodiments, a standby system is maintained in nearly the same state as the primary system, and logs may be replicated synchronously meaning that the primary system will not commit a transaction until the secondary successfully responds to the log replication. Such an arrangement slows performance of the primary system 505, 405a. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

A secondary system in standby mode, such as secondary system 510, can only be as current as its most recently replayed transaction logs. Transaction logs are replicated and replayed at the secondary system 510 only after a transaction executes in the primary system 505. Secondary system 510, therefore, is always slightly behind an associated primary system 515 except when there is no workload at the primary database system during which time the replication processes may catch up to the primary database system. Also, there is no guarantee that a query routed to the primary system in a load balancing effort will be executed before, during or after a particular transaction log is replayed. Thus, the state of the primary system 505 and the state of the secondary system 510 will rarely if ever be identical. But, by addressing certain concerns, a replicated system, or secondary system, 510 may be kept in a state substantially close to the state of the primary system 505 such that the workload required by many operations can be supported by the secondary 510.

As discussed above, a secondary, or backup, database system 405b, 510 may serve the purpose of HA/DR functionality, and a load balancing operation simultaneously utilizes the secondary, backup, database system 405b, 510 to increase throughput of a workload on a primary database system. In practice, updating a database system, or migrating an operational standalone database system to a new database system requires substantial forethought and careful design. Also, regular maintenance of a database system may require increasing a workload to evaluate how the system responds.

When an operational database system provides critical 24/7 operations, for example supporting a public security system, or an international business operation, or a 24/7 worldwide customer facing application, any system upgrades, updates, changes, or hardware replacements typically demand substantial testing before going live in production operations. This may be true when one stand alone system migrates to another stand alone system, when a standalone single instance system, such as system 105 depicted in FIG. 1, migrates to a distributed single instance system such as the variation of 105 as depicted in FIG. 2, or when one system, e.g. any variation of 105, migrates to a HA/DR system with load balancing such as HA/DR the load balancing system 500. In any case, there are many reasons and situations in which a system designer may want to test a database system using a simulated workload. Thus, it is desirable to have a means for capturing a real workload that can be replicated as a simulated workload. It is also desirable to be able to modify the captured workload to test specific features of the target system.

In embodiments, a simulated workload is generated by capturing the internal database operations of an operational database system providing ongoing database operations in response to client application statements. When a statement is received, for example from client application 145, any of the components depicted in FIGS. 1-4, or represented by process control 555, 560 and persistence layer 560, 565, may potentially be tasked with database operations necessary to response to such a statement. Each of these database operations may be captured in a workload capture file and stored for future analysis. Such a workload capture file can also be utilized to later generate a workload replay file. That is, the workload capture file can be analyzed in order to recreate the workload that was captured. For example, a database system 105 may respond to client statements from client applications 145, 150, during which time those statements cause various database operations to execute. Examples include parsing a statement, generating an executable statement that may operate on an in-memory database, generate various logs, update row stores independently of column stores, issue instructions to execute stored procedures, reference the topology of the database system, generate and store temporary results, and so on. These operations can be captured by a workload capture file. At a later time, that captured workload can be replicated to simulate a workload in another database system, for example HA/DR system 500. One reason this may be useful, is if HA/DR system 500 is to replace an instance of database system 105, and a system designer wants to test the workload of the HA/DR system 500. This may be further useful if HA/DR system 500 will make use of load balancing processes such as those in load balancing server 470a, 470b, for example to observe how the load balancing functionality will affect system performance under simulate real world conditions.

Various methods and systems for capturing a workload in a workload capture file and converting that workload into a replayable workload file for replicating the captured workload are disclosed in U.S. patent application Ser. No. 15/150,075 filed on May 9, 2016 and titled DATABASE WORKLOAD CAPTURE AND REPLAY, which is hereby incorporated by reference in its entirety as if set forth fully herein. A capture file may include all or a portion of the various database processes executing within a database system during a workload period.

In embodiments, the volume of information that can be collected for a workload can be large. But, the volume of information can be reduced by only including a portion of the information, such as a portion of the execution information of a database operation. In addition, to assist with organization and compression of the information, in some implementations, the information can be organized in a schema or a dimensional model, such as a star schema. For example, the measures and facts can be used as the central fact table or tables, which reference as points one or more dimensions, each dimension including one or more types of execution information or contexts. In a particular implementation, each point represents a discrete context, and, in addition to any facts or measures, the fact table includes identifiers for corresponding information in the dimensions. In other embodiments, the execution information can be dumped into a simple text file in a stream like fashion for later analysis. In still other embodiments, the capture file can be a list of statements received and executed in chronological order. For simplicity sake, the various types of information that can be captured, and in what format will be discussed throughout the following discussion generally as execution context information.

Figure 6:
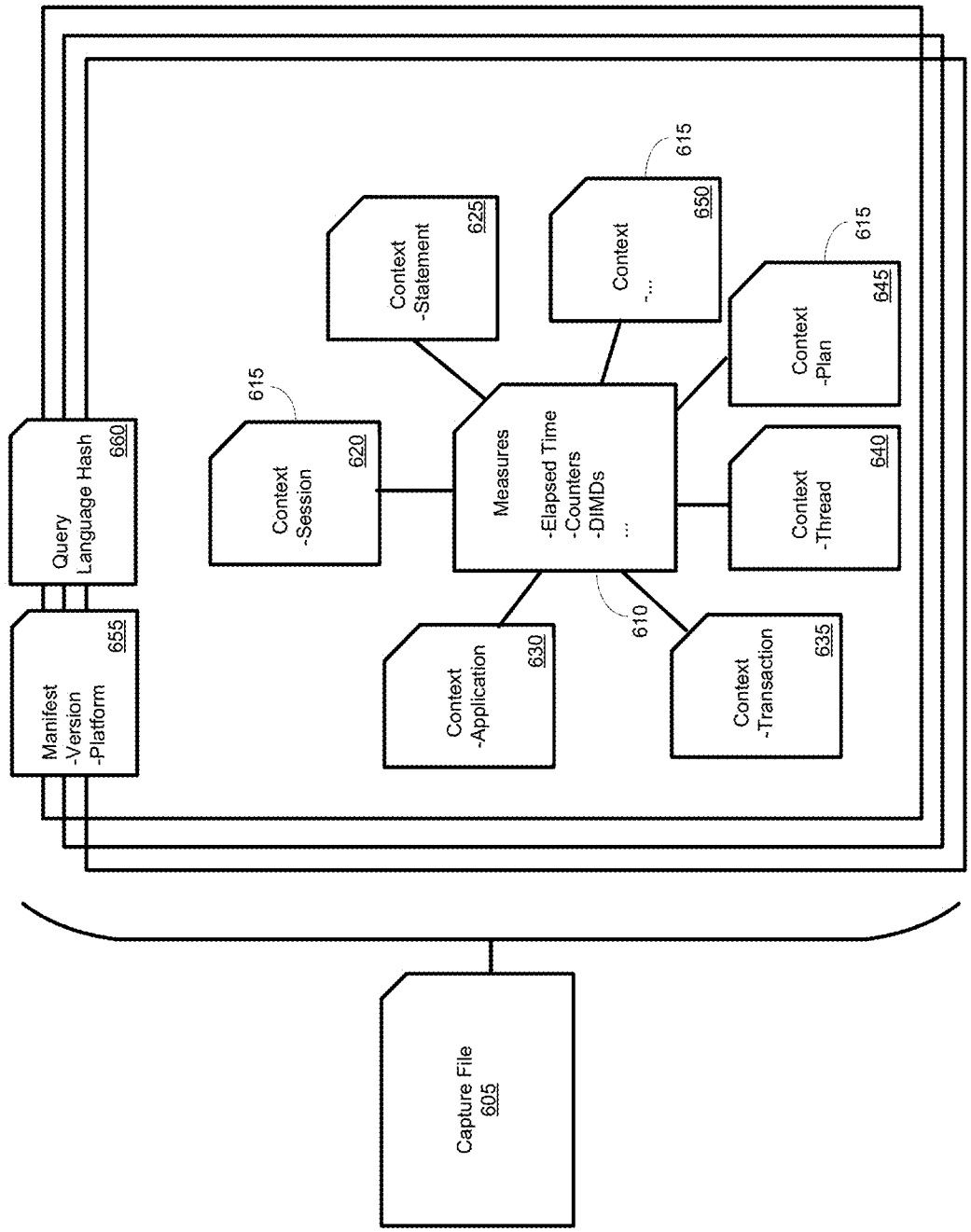
FIG. 6 is a diagram of an exemplary workload capture file schema for storing execution context data and performance data.

An exemplary schema for storing captured workload execution context information is depicted in FIG. 6. FIG. 6 illustrates a capture file 605 that includes a fact table 610 correlated with a plurality of dimensions 615 associated with the fact table 610. Specifically, the fact table 610 is shown as associated with dimensions 615 representing contexts for a session 620, a statement 625, an application 630, a transaction 635, a thread 640, a plan (such as a query execution plan) 645, and other parameters 650. The fact table 610 includes various measures, such as elapsed time and any counters associated with the capture unit associated with the capture file or collection of capture files (such as a session). The fact table 610 also includes dimension IDs (DIMIDs) used to correlate entries in the fact table 610 with each of the dimensional contexts 620, 625, 630, 635, 640, 645, 650. Although a single fact table 610 is shown, in some implementations, multiple fact tables 610 may be used.

The fact table 610 (or tables) and the dimension tables 615 can include records for a plurality of capture units (such as sessions) of a first database system, e.g. 105. In some cases, the fact table (or tables) 610 and each of the dimension tables 615 can be stored as separate files. That is, there may be one file for the fact table 610 (when a single fact table is used) and one file for each of the dimension tables 615. In a particular example, the capture file 605 can incorporate the files for the fact table 610 and the files for each of the dimension tables 615. In some cases, the capture file 605 can be compressed, such as using a compression algorithm. Similarly, files for one or more of the fact tables 610 and then dimension tables 615 can be compressed. In implementations where a database system from which a workload is captured includes more than one server or node, the capture file 605 can, in some aspects, represent activity occurring at a single node of the distributed variation of database system 105. In other aspects, the capture file 605 can be associated with multiple nodes of the distributed variation of database system 105.

The capture file 605 can include additional information. For example, the capture file 605 is shown as including manifest information 655. Manifest information 655 can include, for example, information related to the database system 105, such as a identifier for the program version used to implement the database system 105 and information relating to the computing system used to implement the database system 105 (such as the number and type of processors, amount and organization of memory and physical storage, information related to networked devices implementing the database system, or configuration information for the database system 305 or its components). The manifest information 655 can also include a timestamp associated with the capture file 605 (such a time the capture file was generated, a time the workload capture was initiated, or the time workload capture was discontinued). If filters were used to select workload elements to capture, the filter information can also be included in the manifest information 655. When used to store information related to multiple database nodes, the fact table 610 or dimension tables 615 can include information regarding which of the multiple database nodes was involved in executing operations of the workload capture unit, or a subcomponent thereof (such as in executing a statement associated with a particular session). In a particular example, the manifest information 655 can be stored in a file, such as a compressed file, and included within the capture file 605.

The capture file 605 can also include hash information 660. For example, query language statements in the fact table 610 or the dimension tables 615 can be represented by a hash. The hash information 660 can include a hash table correlating hash values to query language statements. By only storing the hash value of the query language statement in the measure file 610 or one or more of the context files 615, the amount of memory needed to store the workload capture can be reduced.

These hash values can be later used to confirm that execution of requests for database operations when the workload is replayed produced the same results as when originally executed and captured. In some cases, the granularity of hashing can be specified, such as by a user, in such cases, the hash level can be included in the capture file 605, such as in the manifest information 655.

In particular examples, the fact table 610 and the dimension or context tables 615 can be stored as files, and the fact or dimension files grouped together in the context file 605, optionally including a file for the manifest information 655 or a file for the hash information 660. In a particular example, each of the context tables 615 is stored as a separate file within the capture file 605. Each of the capture files may include a dimension identifier (DIMID) field, and one or more value fields. In a specific example, the values can be written in comma separated value format. Similarly, each measure can be stored as a separate file within the capture file 605. Each of the measure files can include a chronological identifier, such as a clock timestamp (such as for the overall database system from which the workload was captured). The chronological identifier can be used, for example, in staging replay of the capture units (such as sessions) represented in the capture file 605. The measure file can also include multiple DIMID fields to associate measures for a particular workload capture unit with its associated dimensions, and one or more numerical fields (such as performance or execution parameters or values). In particular examples, the DIMID or numerical fields can be written in comma separated value format.

In some cases, context files and one or more measure files can be stored for each of a plurality of services in a database system. The set of context files and one or more measure files for each of the services can be included in the capture file 605 (which, in at least some examples, represents a single database server or node, such as when the database system is distributed among multiple servers or nodes). For example, a database system can have separate services that include query language processing components and data stores, that produce information regarding the distribution of information (including database records) and database system components in the database system, that are responsible for handling certain types of client communications, such as web or http-based interactions, that manage various memory stores (such as transferring data between persistent storage and in-memory storage), and that monitor resource (such as CPU or memory) use in the database system (including across multiple database servers, when the database system is a distributed system).

Figure 7:
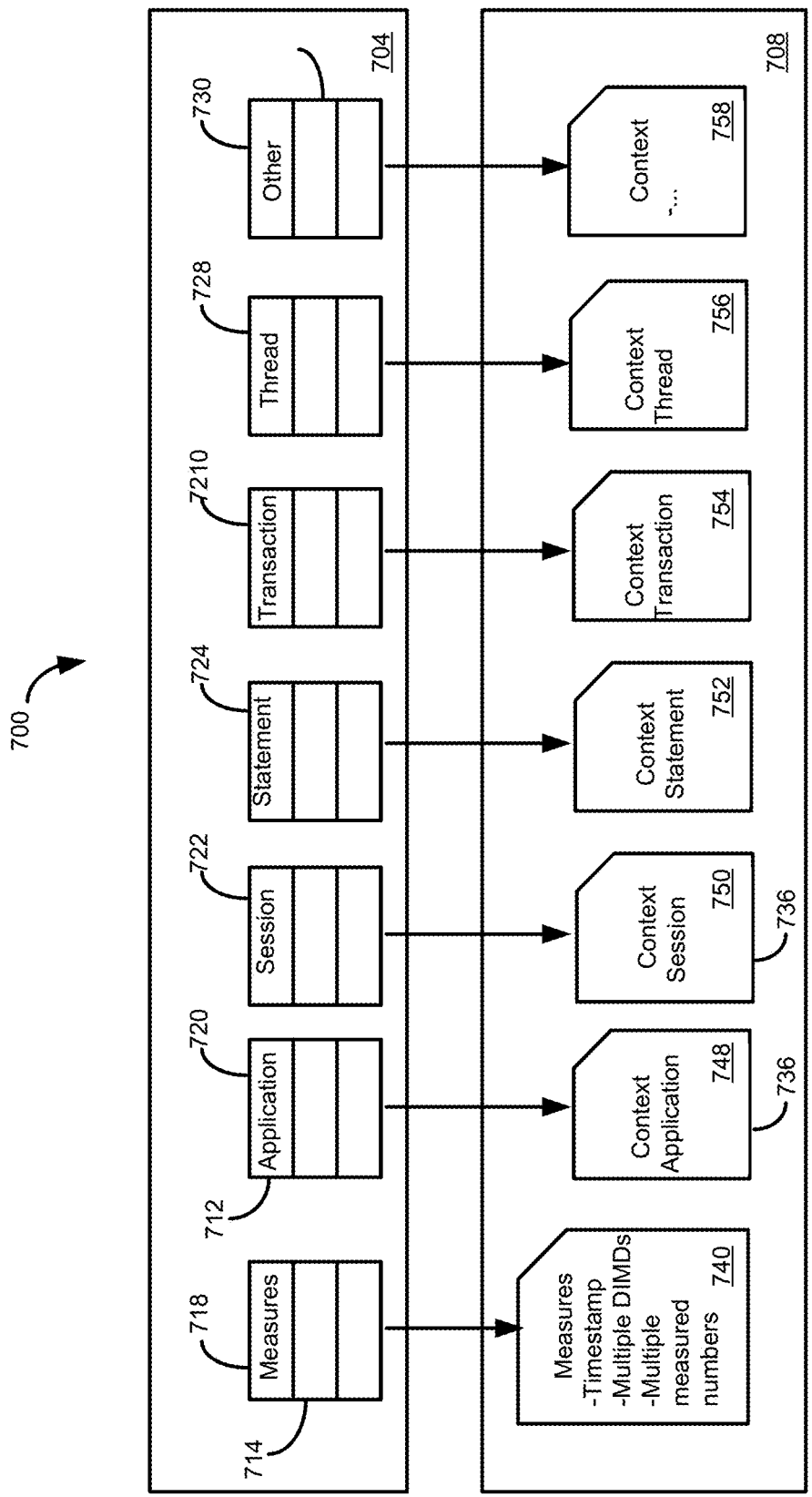
FIG. 7 illustrates a database environment depicting a process for storing information from a measurement framework in a capture file.

FIG. 7 illustrates a database environment 700 depicting a process for storing information from a measurement framework 704 in a capture file 708, such as capture file using the schema of FIG. 6. For each of the capture units, the measurement framework 704 can store a mapping of facts and measurements associated with the capture unit with the corresponding context information. In particular examples, the mapping can be stored in memory, such as in buffers 712 for each of a plurality of contexts and a buffer 714 for measures 718 associated with capture units. FIG. 7 illustrates buffers 712 for contexts 716, including an application context 720, a session context 722, a statement context 724, a transaction context 726, a thread context 728, and, optionally, other contexts 730.

The buffers 712 can be written to the schema of the capture file 708. In some cases, the buffers 712 can be written to separate files 736 for each of the contexts 716, such as files for context data for an application 748, a session 750, a statement 752, a transaction 754, threads 756, and, optionally, other context information 758. The buffer 714 can be written to a measure file 740. The data in the buffers 712, 714 can be compressed prior to being written.

Although a single buffer 714 and a single measure file 740 are shown for the measures 718, in other cases, multiple buffers 714 or files 740 can be used. For example, multiple buffers 714 can be used when the capture file 704 includes multiple measure files 740, or information from multiple buffers 714, such as buffers representing different measures or facts, can be aggregated into one or more measure files 740. The measure file 740 can store information for one or more capture units, including an identifier, one or more facts or measures, and identifiers for context information stored in the context files 736.

In some cases, the buffers 712, 714 may be written to their corresponding files 736, 740 when a workload capture is completed. In other cases, the buffers 712, 714 can be written periodically during workload capture. For example, each of the buffers 712 and the buffer 714 can be assigned a threshold size. If a particular buffer of the buffers 712, or the buffer 714, exceeds the threshold, the buffer can be written to its corresponding file 736, 740 and emptied. In other cases, the buffers 712, 714 can be written periodically in another manner, such as at particular time intervals or after a particular number of capture units have been added to the buffers. When the workload capture process has been completed, the files 736, 740 can be combined, such into the capture file 605 of FIG. 6. In particular examples, the files 736, 740 can be compressed as they are combined.

The database environment 700 may be implemented in a different manner. In a particular implementation, rather than a single buffer for each of the contexts 716 and the buffer 714 for the measures 718, the database environment can include multiple buffers. For example, two (or more) buffers can be included for each of the contexts 716 and for the measures 718. Data can be written to the first buffers until a buffer is filled, at which time it can be written to a file as described above. During the writing process, information can be stored in the second buffer, which is then written when filled, and new data stored in the first, now empty, buffer. Also, rather than having separate buffers for each of the contexts 716 and the measures 718, the contexts and/or measures may be stored in a common buffer. When filled, the buffer can be written to respective context and measure files 736, 740. The environment 700 can include one or more additional common buffers to be used when a first common buffer is being written.

Figure 8:
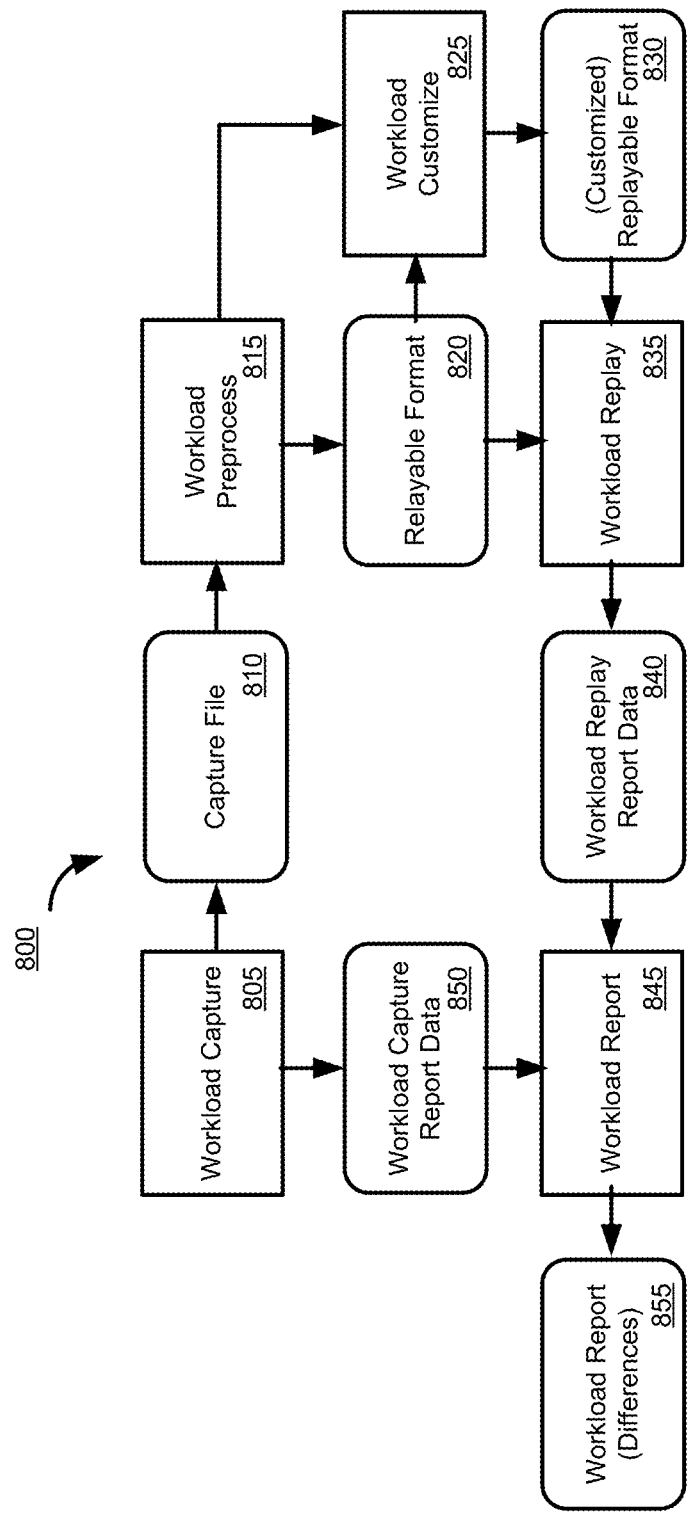
FIG. 8 is a diagram of a process 800 for comparing performance statistics of a workload executed at a first database environment with performance statistics of the workload executed at a second database environment.

FIG. 8 is a diagram of a process 800 for comparing performance statistics of a workload executed at a first database environment with performance statistics of the workload executed at a second database environment. In step 805, a workload, such as one or more requests for database operations (which may be associated with one or more database sessions) is captured at a source system, such as described in conjunction with FIGS. 1-5. The capture process 805 generates a capture file 810, such as a capture file having the structure of the capture file 605 of FIG. 6.

The capture file 810 is processed in process 815 to produce captured requests for database operations and associated data in a replayable format 820. The processing in step 815 can include extracting or decompressing individual context and measure files from the workload capture file 810. If the individual context and measure files were compressed, they can also be extracted or decompressed.

During step 815, individual capture units, such as sessions, and/or subcomponents thereof (e.g., statements) can be reconstructed from the context and measure files. For a particular measure, relevant context information can be retrieved based on dimension or context identifiers stored with the measure. For example, statements in a session can be associated with corresponding context information, such as a query language statement and context information (or triggers to generate the context information) that would have been received by the database system from which the workload was captured.

In some cases, the capture units, and operations within the capture units, can be ordered during the processing step 815. For example, the capture units, or operations, can be ordered chronologically use a time associated with the capture units or operations (e.g. a system timestamp, commit timestamp, or other identifier). In other cases, the capture units are reconstructed during processing step 815, but are not ordered. Ordering can occur, for example, during replay of the replayable format 820.

In particular examples, the replayable format 820 can be a replay file, such as a file stored on a hard disc or other persistent storage medium or non-volatile memory. In other examples, the replayable format 820 can be stored in a different manner, such as in volatile memory. While in some cases the replayable format 820 may be a single store or file, in other cases information in the repayable format 820 can be included in multiple stores or files.

The replayable format 820, including a replay file, can include information regarding the workload capture process and workload capture system, such as a database software version associated with the source data system, information regarding the configuration (including processors and available memory) of the source database system, and start and end times for the workload capture. The replayable format 820 can also include information regarding any filters applied to workload elements being captured, such as workload elements associated with particular applications, users, clients, statement types, or elements exceeding a threshold duration. Statistics regarding the capture process, such as the number of capture units (e.g., sessions), statements, and/or committed transactions recorded in the replayable format 820 can also be stored in the replayable format 820. The replayable format 820 can further include information regarding the processing step 815, such as a software version associated with a processing component generating the replayable format, information about a computing system used to carrying out the processing step, and start and end times for the processing.

The replayable format 820 can include additional information. For example, information can be included regarding database users, such as information that would have been transmitted to the source database system when the workload was generated. Information regarding query language elements can be included in the replayable format 820, such as codes for DDL (data definition language), DML (data manipulation language, e.g., SELECT, UPDATE), and DCL (data control language) operations. The replayable format 820 can also include information regarding query language statement strings, such relating an identifier (such as a hash value) to a particular query language statement string.

Other types of information that can be included in the replayable format 820 include information regarding the number of batch updates at the source database system during workload capture, values of nondeterministic functions, and information regarding nested statement in workload capture units, or elements thereof (such as in CALL statements). Hash value results, such as those used to verify consistent execution between the source database system and the second database system can be included in the replayable format 820.

The replayable format 820 can also include information, including in individual files, related to individual capture units, such as database sessions. Information for the capture units can include connection identifiers, information regarding the capture unit, or suboperations thereof, such as a start time for a request, a request type, and context information associated with the request. Parameters, such as measures, associated with the capture unit can be included in the replayable format 820. The replayable format 820 can also include identifier information for the capture unit, such as a session ID, a user name, a particular schema associated with the user, etc.

In optional process 825, the captured workload in the replayable format 820 can be customized to produce a customized captured workload in a replayable format 830. In embodiments, optional process 825 may operate directly on preprocessed capture files, or alternatively directly on the capture file captured at 810. In embodiments, process 825 includes selecting particular users, clients, applications, sessions, etc. associated with the first database environment to be replayed at the second database environment. A user may also select particular segments of a captured workload to be replayed, rather than replaying an entire workload, or can merge multiple workloads (or segments thereof) to be replayed, such as simultaneously or sequentially. In some aspects, a user can also select the speed at which the workload should be replayed. That is, in some cases, requests for database operations can be replayed with the same time interval experienced at the source system. In other cases, the user can select the workload to be replayed in another manner, such as increasing or decreasing the replay speed versus the speed database operations were carried out at the source database system.

In process 835, the captured workload in the replayable format 820, or the customized workload in replayable format 830, is replayed at the second database environment. The replay 835 can include reading information associated with individual capture units, or operations thereof, from the replayable format 820. In some cases, the information can be read sequentially from the replayable format 820. In other cases, a replayer component can select capture units, or operations thereof, to be replayed in a particular order. For example, the replayer may select capture units, or operations, in the replayable format 820 to be replayed based on order in which the capture units or operations were received by the source database system, such as a chronological order. The chronological order can be determined, for example, using an identifier (e.g., a system timestamp, a commit timestamp, or other identifier).

In embodiments, the replayer cause multiple capture units, or operations, to be sent to, or replayed at, the second database system. In particular implementations, workload elements received by the second database system, to be replayed, can be received in a format analogous to the format in which they were received by the source database system. That is, the replay information can resemble requests for database operations produced by an external database client (or by internal database operations of the source database system). The replay 835 produces an output 840, such as workload replay report data, that includes performance measures associated with the execution of the workload at the second database environment.

A workload report process 845 can be carried out, such as comparing workload replay report data with workload capture report data 850, such as data including performance measures associated with the execution of the workload at the first database environment, such as performance measures associated with the capture file 810, the workload in the replayable format 820, or the workload in the customized workload replayable format 830. In at least some implementations, one or both of the workload capture report data 850 and the workload replay report data 840 can be structured as, or include information in, the capture file 405 of FIG. 4.

The workload report process 845 can produce a workload report 855, such as a report comparing execution of the workload at the first database environment with execution at the second database environment. For example, the workload report can include information regarding processor usage, wait times (such as average execution time), query language statement throughput (such as the number of executed statements), number of connections with other database servers or other components, query performance, comparisons of query results or query plans between two database systems, candidate and execution locations of statements, and information regarding the consistency of tables between the two database environments.

Figure 9:
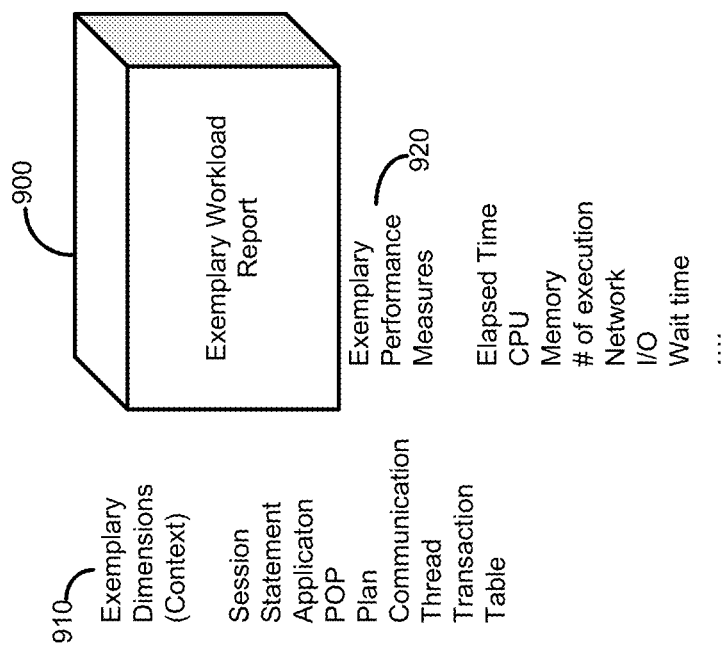
FIG. 9 illustrates a diagram depicting an OLAP cube of workload report useable to compare the performance of a first database system with a second database system according to an embodiment of the present disclosure.

The workload report 855 can include information comparing and summarizing the performance of the entire workload replay, or individual elements of the workload replay. For example, the report 855 can provide information comparing the execution of particular capture units, or particular operations within a capture unit. In a particular example, the report 855 is stored as database records or is derived from database records, such as in an OLAP cube. FIG. 9 illustrates an OLAP cube 900, and dimensions 910 and measures 920 that can be included in the cube. In some cases, the OLAP cube 900 can be a hypercube, having more than three dimensions 910.

Figure 10:
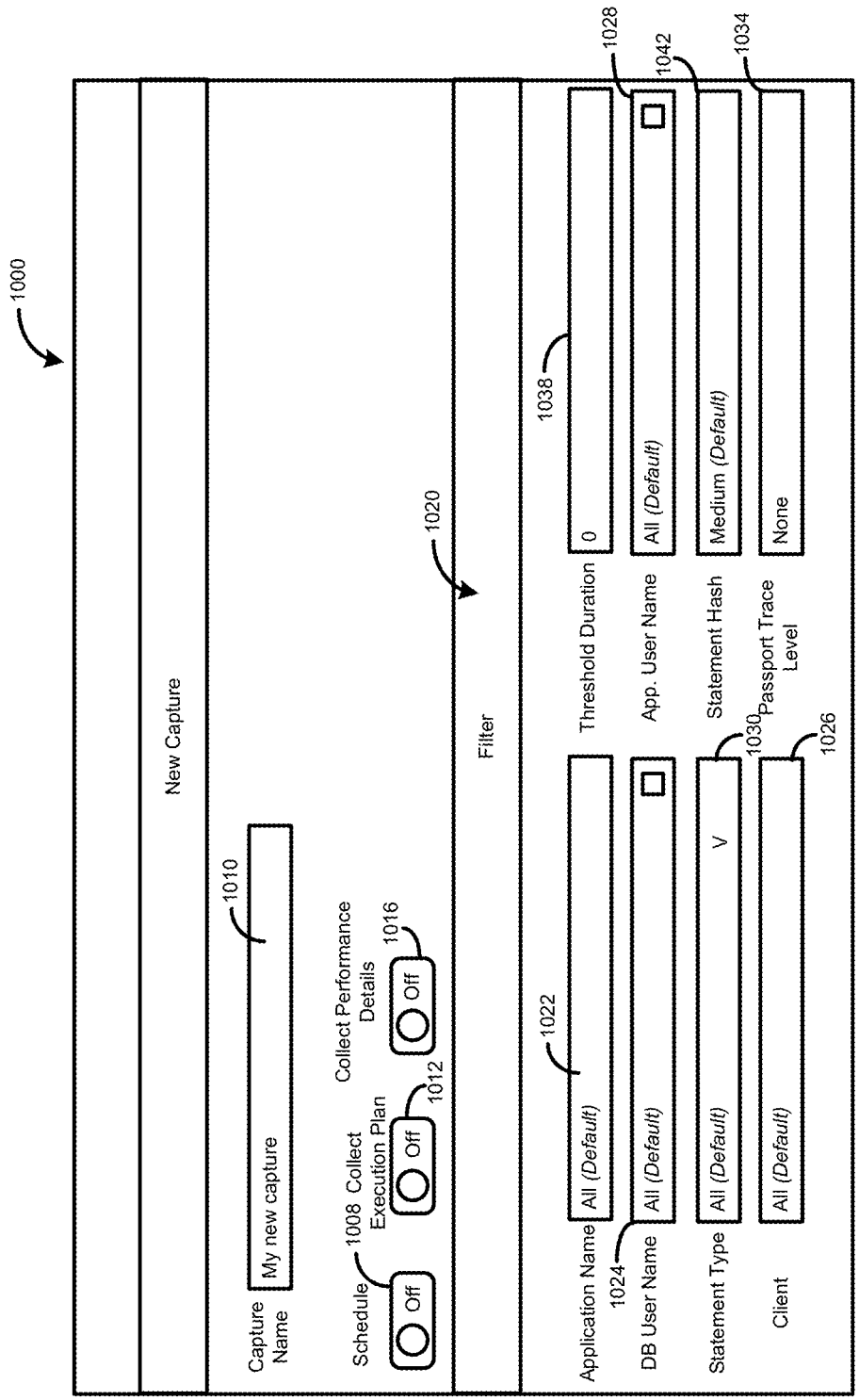
FIG. 10 is an example UI screen for initiating a workload capture, including selection of workload capture filter criteria.

In embodiments, a mechanism is provided to allow a user, such as a database administrator, or another process, to select workload elements to be captured when a new workload capture file is initiated. FIG. 10 is an example UI screen 1000 illustrating workload capture options that may be set by a user in a particular implementation. In other implementations, a user may select more, fewer, or different options than presented in FIG. 10. In addition, the UI interface screen 1000 may be structured differently, or the user input specifying capture details can be specified other than through a UI screen. Although shown in conjunction with workload initiation, elements of the screen 1000 allowing workload capture to be defined (including filter criteria) can be included in an analogous UI screen to edit the properties of a previously created workload capture.

Screen 1000 includes a Capture Name field 1010, where a user can enter a name to identify the particular workload capture process being defined. Screen 1000 includes a schedule field 1008, where a user can select whether the workload capture process should be carried out according to a schedule, such as being set to occur at a defined time, or to recur at particular times or intervals. Through field 1012, a user may select whether to collect an execution plan associated with a query language statement, such as a query plan. Similarly, the user may be provided with an option to collect performance details associated with the workload/ workload capture units or elements through field 1016. Collecting execution plans and performance details can enable more detailed comparisons to be made between database systems executing the workload, but can increase processor and memory use.

A filter portion 1020 of the screen 1000 can provide a user with filter elements that may be selected for the workload. In at least some aspects, the use of a filter is optional. In some cases, a user may select multiple filter criteria to be applied to workload capture. In other cases, a user may be limited to selecting a particular filter criterion or particular combinations of filter criteria.

The filter portion includes fields allowing a user to select only workloads originating from selected applications 1022, particular database users 1024, clients 1026, and application user names 1028. Using field 1030, a user can select one or more types of statements to be captured. For example, among other things statements can include data manipulation statements (e.g., DELETE, INSERT, REPLACE, SELECT, UPDATE), data definition language statements (e.g. ALTER TABLE, CREATE INDEX, CREATE SCHEMA, CREATE SEQUENCE, CREATE STATISTICS, CREATE TABLE, CREATE VIEW), procedure statements (e.g. CALL, CREATE FUNCTION, CREATE PROCEDURE, CREATE TYPE), transaction statements (e.g. COMMIT, LOCK TABLE, ROLLBACK, SET TRANSAC- TION), session statements (e.g. CONNECT, SET HISTORY SESSION, SET SCHEMA, SET [SESSION], UNSET [SESSION]), or system statements (e.g. ALTER SYSTEM CONFIGURATION, ALTER SYSTEM SESSION SET, ALTER SYSTEM SAVE PERFTRACE, ALTER SYSTEM SAVEPOINT).

With a trace level field 1034, a user can select that only particular statements associated with a particular tracing level be included in the workload. For example, statements may be associated with a high, medium, or low tracing level. As tracing level moves from low to high, an increasing amount of information can be captured for the statements, such as access level logging for low tracing levels, packet logging at a medium trace level, and entire statement contents being traced at a high level of tracing. In particular implementations, a user may select to change the tracing level normally associated with a particular type of statement such that the statements are captured by the workload capture filter.

In field 1038, a user can select that only statements meeting or exceeding a threshold duration are captured. For example, if there are a significant number of requests for database operations, such as requests which include queries, capturing only requests (or components thereof) exceeding a threshold can reduce any performance impact of the workload capture process.

In field 1042, a user can select a statement hash level to be used in the workload capture, such as described above in Example 5. The hash level can be used to determine the granularity of result verification during the replay process. While a higher granularity can improve result verification, it can result in higher resource use at the workload capture database system and the replay database system.

Figure 11:
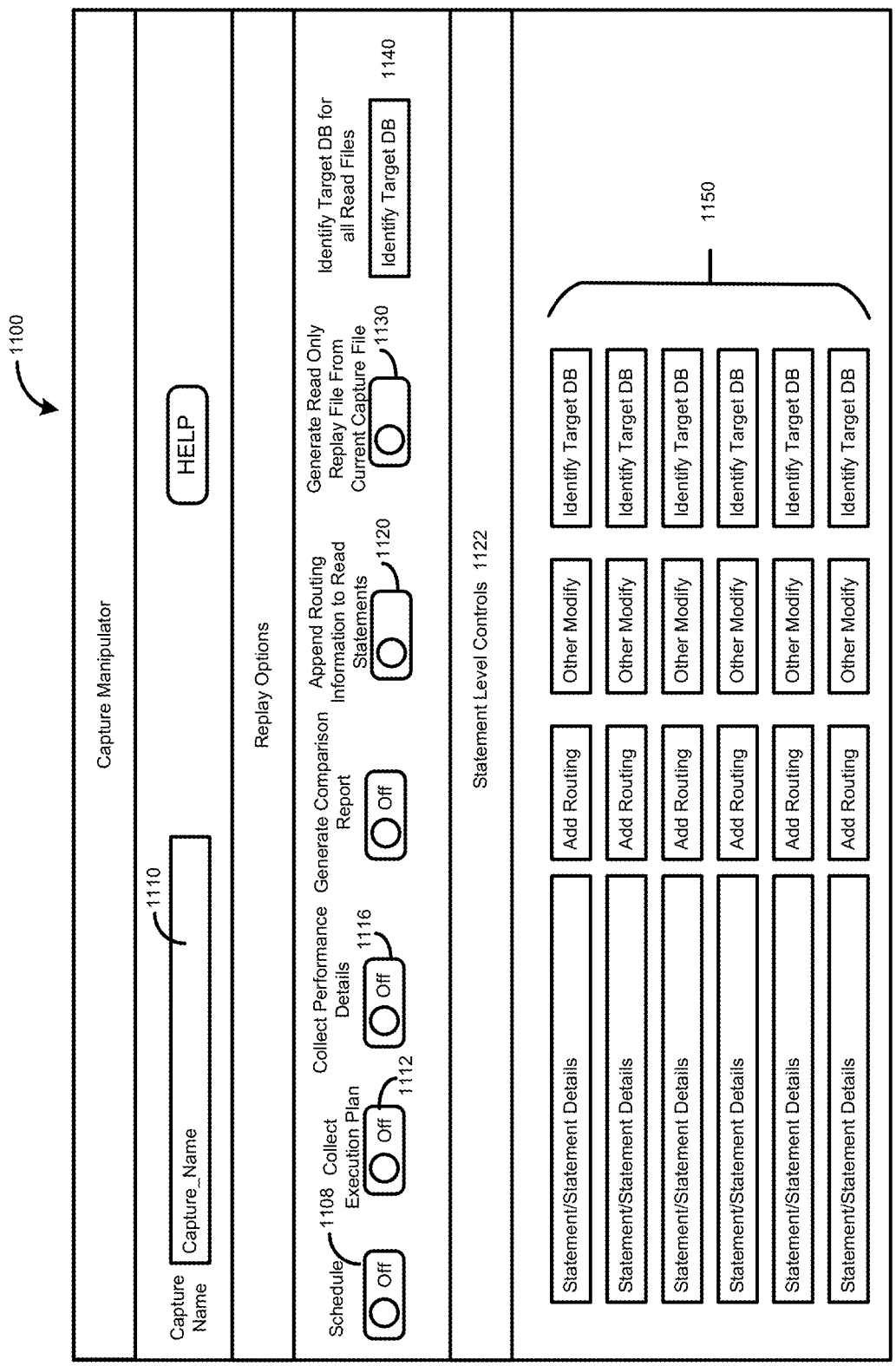
FIG. 11 is an example UI screen for modifying a workload capture, including selection of workload capture filter criteria.

FIG. 11 is an example UI screen 1100 illustrating workload capture file modification interface that may be set by a user in a particular implementation. In other implementations, a user may select more, fewer, or different options than presented in FIG. 11. In addition, the UI interface screen 1100 may be structured differently, or the user input specifying modification details can be specified other than through a UI screen. Although shown in conjunction with workload modification, elements of the screen 1100 allowing workload capture to be modified can be included in an analogous UI screen to edit the properties of a previously created workload capture or previously modified workload capture.

Screen 1100 includes a Capture Name field 1110, identifying the particular workload capture process being modified. Screen 1100 includes a schedule field 1108, where a user can schedule when the modified workload will be replayed, for example at a defined time, or to recur at particular times or intervals. Through field 1112, a user may select whether to collect an execution plan associated with a query language statement, such as a query plan during a replay of the modified workload. Similarly, the user may be provided with an option to collect performance details associated with the workload/workload capture units or elements through field 1116 during replay. Collecting execution plans and performance details can enable more detailed comparisons to be made between database systems executing the modified workload, for example to compare with either the original workload execution or other executions of the modified workload.

A hint based routing selector 1120 of the screen 1100 can provide a user with the ability to append hint based routing information to queries, causing the workload to be executed reliant on hint based routing and load balancing features of the system during replay. The use of the hint based routing selector 1120 is optional. Similarly, a read only selector 1130 of the screen can provide a user with the ability to extract only execution information related to read statements from the capture file for replay. Another portion of the screen may allow a user to identify a particular target database 1140 to execute the workload. For example, in a redundant system, such as HA/DR system 500, a user can specify that the workload is to be executed by the primary database system 505 or the secondary database system 510, or that the target database system is the HA/DR system 500 relying on load balancing processes to distribute the replicated workload.

Screen 1100 may also include a statement level control field 1122. A statement level control field 1122 may allow a user to selectively modify specific statements 1150, or database operations, thereby affording the user a finer granularity in the controlling the modified workload. For example, among other things individual statements can be modified to include routing information (e.g., a DELETE statement becomes a DELETE statement with hint based routing enabled, that is DELETE→DELETE{HR}, similarly INSERT→INSERT{HR}, REPLACE→REPLACE{HR}, SELECT→SELECT{HR}, UPDATE→UPDATE{HR}, and so on where {HR} represents the hint based routing information). Screen 1100 can be adapted to allow any desired modifications to the workload. Modifying a statement to include routing information may include hint information indicating which database is the favored database for executing the statement, or the routing information may include one or more explicit conditions that have to be satisfied before a statement may be routed. These conditions may include a time delay between a replicated system and the primary system, or the conditions may include a minimum amount of system resources available at either the primary system or its replica system. Or the conditions may be based on the present workload on the system. These conditions and more may be selected for a particular statement based on the tests being performed and the preferences of the system, or specific application, designer.

Once a workload capture file is obtained, in embodiments another mechanism is provided for modifying the contents of the workload capture file. Modifying a workload capture file is useful for example where one aspect of a database system requires testing, in which case a workload capture file can be modified to focus on the desired aspect. For example portions of the workload that implicate aspects of the database that are irrelevant to a particular test may be filtered. In another example, a workload capture file may contain execution context information and performance measures related to a production database operation that will undergo an update or a system reconfiguration. Prior to introducing an update or system reconfiguration into production operations, tests may be performed based on the captured workload represented by the context information and performance measures of the workload capture file.

In embodiments, the workload capture file is modified to introduce hint based routing information to the workload in order to test the load balancing features of redundant database system relying on hint based routing, such as in systems 405a, 405b. Alternatively, where it is desirable to test how a backup system responds to read service during active replication processes, for example by transaction log replay at a backup database, a workload file may be modified to extract only read statements, such as in HA/DR system 500. These modified workload replay files may then be replayed during test operations under near real world conditions as captured in the workload replay file during actual production usage of the original database.

Figure 12:
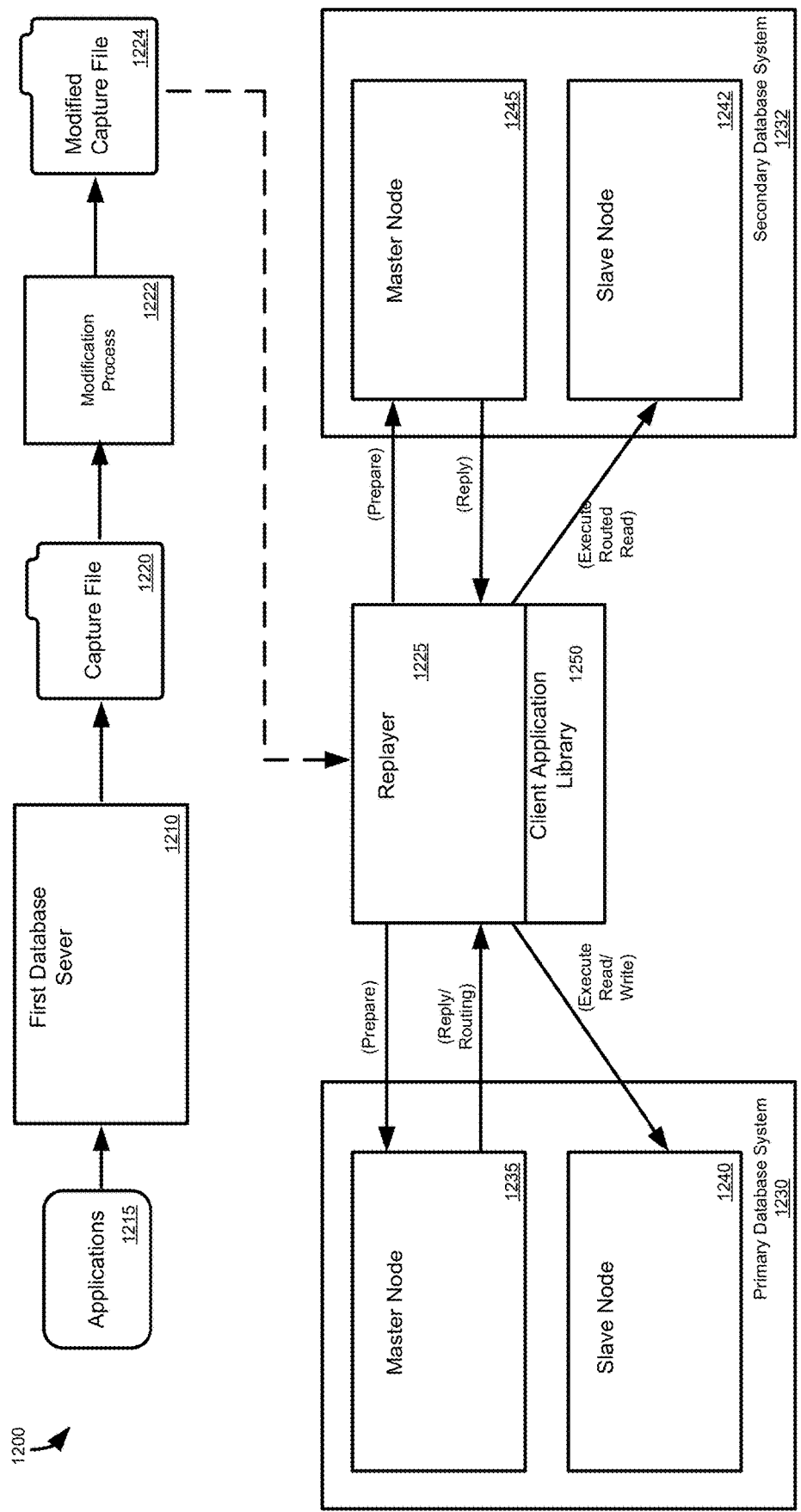
FIG. 12 a diagram of a database environment for modifying a captured workload to include routing information associated with requests for database operations captured at a first single instance database system and replaying the requests for database operations in redundant distributed database systems.

Having obtained a modified workload capture file, it may be utilized to perform database system testing simulating workload conditions comparable to the conditions during the workload capture process. FIG. 12 illustrates a diagram of an exemplary process 1200 for capturing a workload of a first database server 1210 in a workload capture file 1220 as it responds to and supports one or more applications 1215. In embodiments, the database system 1210 is a single instance database such as database system 105 as described by FIG. 1. The workload capture file 1220 is modified by a modification process 1222, for example involving a user interfacing with the process by screen 1100, to obtain a modified workload capture file 1224. This modified workload capture file is then replayed by a replayer 1225 that is configured to process the workload capture file to generate database commands, database operations, or statements to be executed by one or more databases.

The replayer 1225 may interact with a client application library 1250 in order to issue statements to the target database system based on the workload capture file. FIG. 12 illustrates replaying the workload capture file within a database system comprising a primary database system 1230 and a secondary database system 1232. Database systems 1230 and 1232 may be part of an HA/DR system such as system 500. And the database systems 1230 and 1232 may perform load balancing operations such as database systems 405a and 405b, thereby load balancing the simulated workload generated by the replayer 1225. As illustrated, the database systems 1230 and 1232 are distributed systems including master nodes 1235, 1245 and slave nodes 1240, 1242. Alternatively, database systems 1230 and 1232 could be single instances systems similar to database system 105 as described in FIG. 1.

Figure 13:
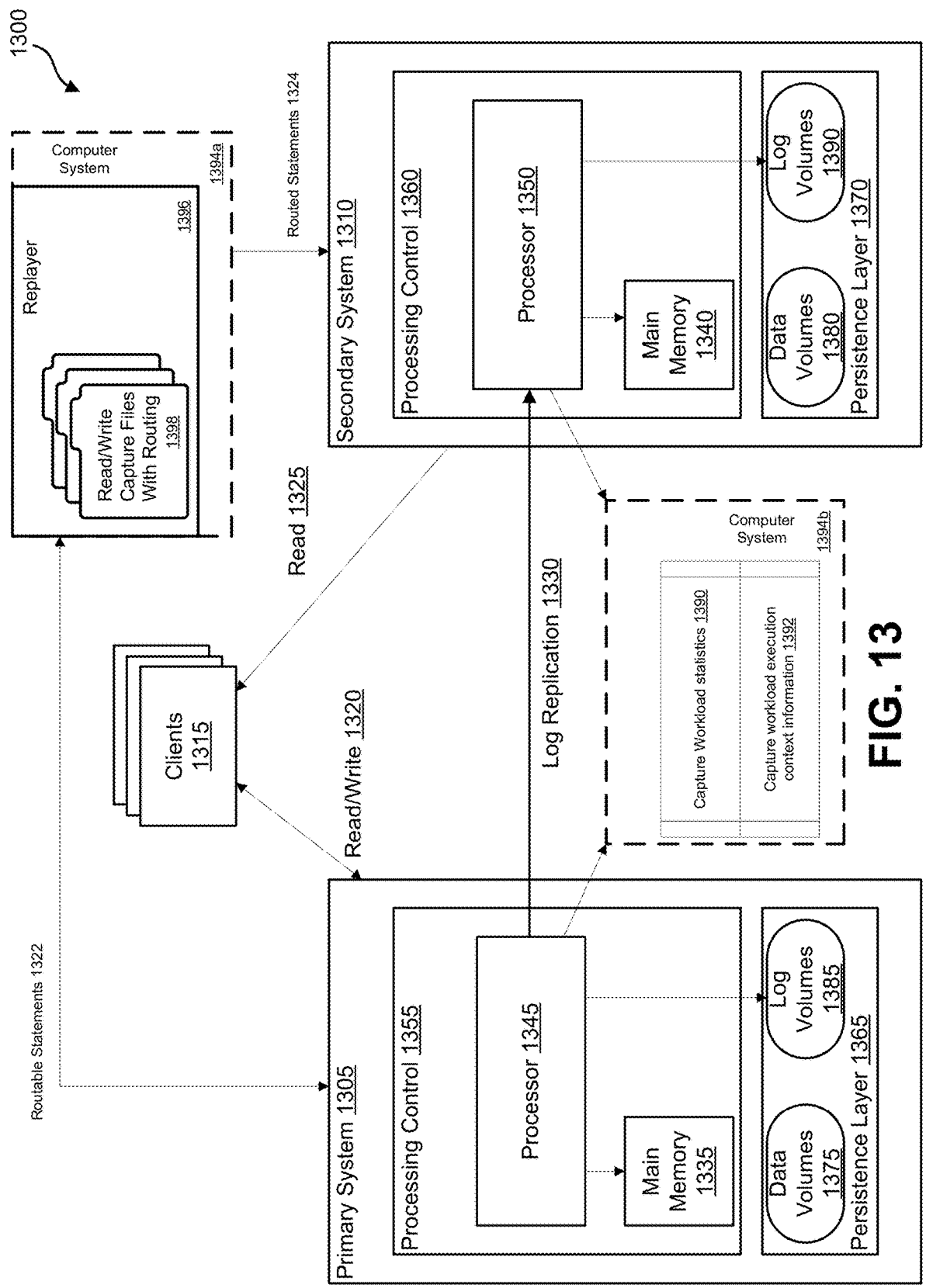
FIG. 13 is a functional flow diagram depicting one example solution to testing load balancing operations in a HA/DR system for use in connection with the current subject matter.

FIG. 13 illustrates an HA/DR system 1300 including a primary database system 1305, a secondary database system 1310, one or more client systems 1315, and computer systems 1394a and 1394b. Computer systems 1394a and 1394b include a replayer 1396 and workload capture processes 1390 and 1392. Computer systems 1394a and 1394b may alternatively be the same computer system or they may be distinct computer systems. In some embodiments computer systems 1394a and 1394b are either the primary system 1305 or the secondary system 1310, and the replayer 1396 and the workload capture processes 1390 and 1392 are processes within process control 1355, and 1360 and executing on processors 1345, 1350. In other embodiments computer systems 1394a and 1394b are a client computer system 1315 and rely on a client application library to interact with primary system 1305 and secondary system 1310. The HA/DR system 1300 may be tested using replayer 1396 to generate a workload in addition to a workload provided by one or more client applications. In this way a customized workload can be replayed while concurrently testing client applications as they interact with primary system 1305 and 1310 under the customized workload embodied in the modified capture files. In embodiments the capture files have been modified to interact with load balancing processes within process control 1355, 1360, for example by appending hint based routing information in one or more of the statements captured in the modified capture files 1398.

When a replayer 1396 issues a routable statement 1322 to a primary system 1305, load balancing processes of process control 1355 executing in processor 1345 may determine that the statement may be executed locally at primary system 1305. If the statement is a write statement, it may cause one or more updates that become committed to one or more databases maintained by primary system 1305, for example an in-memory database in main memory 1335. These updates may eventually become persisted, for example in a savepoint image stored in data volumes 1375 in persistence layer 1365. These updates may also generate transaction logs that may be stored in log volumes 1385 before or after the logs are replicated 1330 to the secondary system 1310. Upon receiving the logs, processes within process control 1360 may replay the transactions contained within the transaction log, thereby replicating the updates caused by routable statement 1322. These replicated updates cause updates to a replicated, or mirrored, copy of the one or more databases maintained by secondary system 1310, for example an in-memory database in main memory 1340 that is a replica of an in-memory database in main memory 1335. These updates may also later be persisted in data volume 1380 in persistence layer 1370 in a savepoint image. These updates further generate transaction logs that are stored in log volumes 1390.

While the replayer 1396 generates workload based the modified capture files 1398, clients 1315 may also be engaged in generating workload based on client applications, which also causes read statements and write statements 1320 to be issued and routed by the load balancing processes and executed by either the primary system 1305 or the secondary system 1310. While the workload generated by the replayer 1396 and by the clients 1315 is routed between the databases, and as updates are executed in primary system 1305 and replicated to secondary system 1310, computer system 1394b executing a capture workload statistics process 1390 captures various performance measures, while process 1392 may also capture the workload generated by routable statement 1322 and the client statements 1320, 1325 in each of the systems 1305 and 1310.

In embodiments, the routable statement 1322 is received by primary system 1305 and the load balancing processes executing in processor 1345 may determine to route the statement to the secondary system 1310 for execution. The primary system 1305 may send the statement directly to the secondary system 1310, or alternatively, the primary system 1305 routes the statement back to the replayer with instructions to route the statement to the secondary system 1360, thereby simulating a client performing hint based routing load balancing operations. The routed statement 1324 is then issued to and received by the secondary system 1310, causing the secondary database system to execute the statement 1324. The statement may for example be a read statement requesting read operations in an in-memory database held in main-memory 1340 as a replicated database of a database maintained by primary system 1305.

While the replayer 1396 generates workload based the modified capture files 1398, clients 1315 may also be engaged in generating workload based on client applications, which also cause read statements and write statements 1320 to be issued and routed by the load balancing processes and executed by either the primary system 1305 or the secondary system 1310. While updates are executed in primary system 1305 and replicated to secondary system 1310, and returns are generated responsive to that workload by both the primary system 1305 and the secondary system 1310, computer system 1394b executing a capture workload statistics process 1390 captures various performance measures, while process 1392 may also capture the workload generated by routable statement 1322 in each of the systems 1305 and 1310.

While the statements are routed between the systems 1305, 1310 and while the read operations requested by routed statement 1324 are executed the secondary system 1310, computer system 1394b executing a capture workload statistics process 1390 captures various performance measures, while process 1392 may also capture the workload generated by routed statement 1324 in each of the systems 1305 and 1310.

Figure 14:
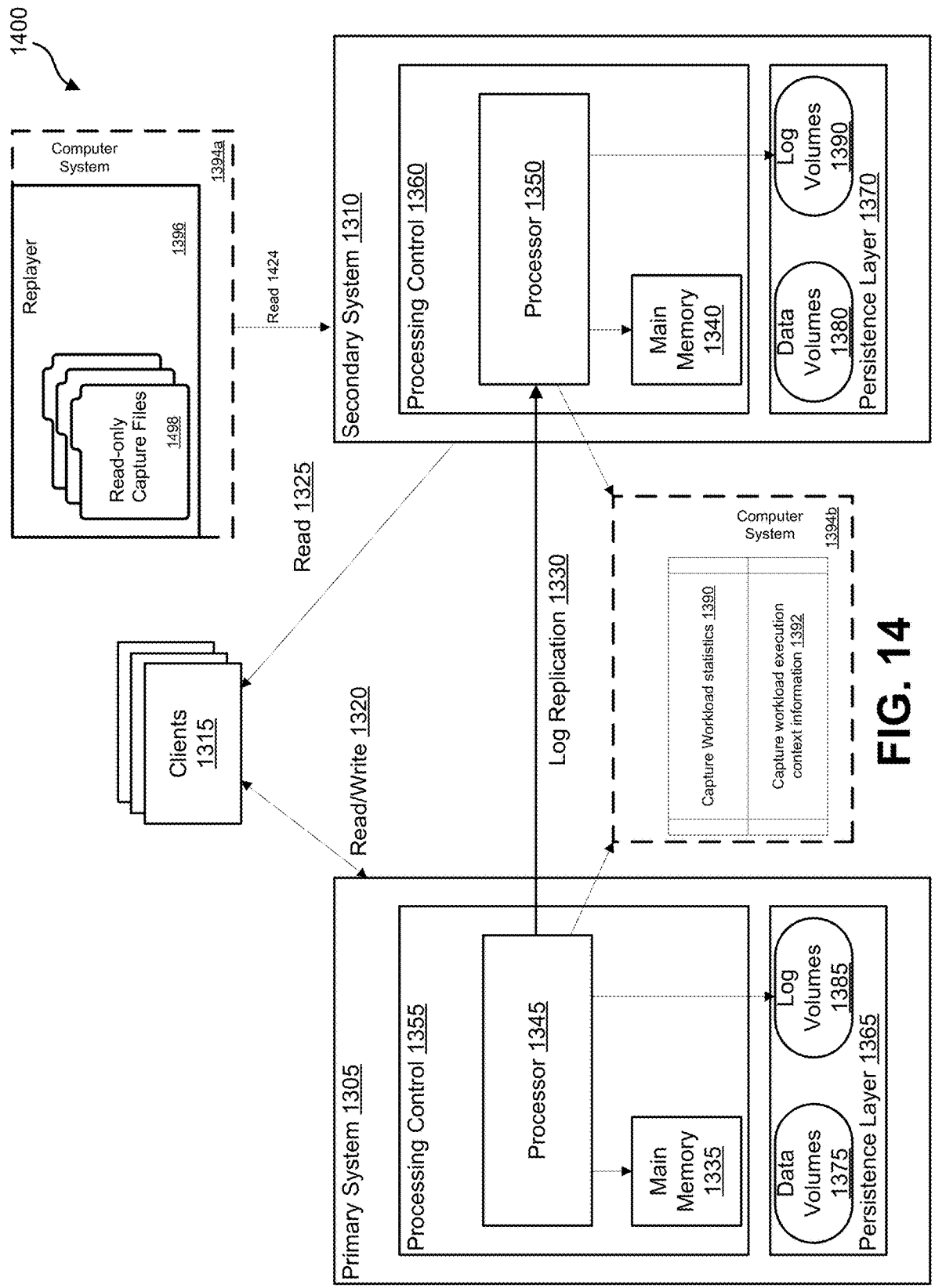
FIG. 14 is a functional flow diagram depicting one example solution to testing operations in a HA/DR system for use in connection with the current subject matter.

FIG. 14 illustrates a process of executing a modified workload based on capture files containing database operations and statements relating to read service only, for example SELECT statements, or any other statements that do not cause updates to a database system. As illustrated, clients 1315 may be engaged in normal operations, for example interacting with primary system 1305 and secondary system 1310 through various client applications dependent on databases maintained by primary system 1305 and 1310. The databases of primary system 1310 are a replicated copy of the databases of 1305 by replaying replicated logs 1330 received from primary system 1305. The secondary database system may be a hot-standby system that mirrors the databases of system 1305, and therefore cannot cause changes to the databases while in backup mode (i.e. before a failure in the primary system causes the secondary system to assume the primary system operations).

During normal operations of clients 1315, the secondary system 1310 may provide read service only in support of load balancing operations, by executing read statements intended for a database maintained by the primary system 1305 and mirrored in the secondary system 1310. Thus, certain read statements 1320 received by a primary system 1305 may be routed under load balancing operations to a secondary system 1310. Or, clients 1315 may issue selected read statements 1325 directly to secondary system 1325 based on a load balancing process embodied in the client application library. In some cases, it may be useful for a replayer to issue only read statements 1424 directly to the secondary database system 1310, thus replayer 1396 replays a workload capture file 1498 that may originally have been captured during normal database operations, and modified to contain only the read statements issued during the capture period. Or, the workload file 1498 may have been tailored by insert a number of additional read statements into a captured workload file that are to be executed directly on the secondary database without hint based routing. As in the exemplary embodiments discussed above, during this period, computer system 1394b may capture the workload and performance measures while executing workload capture processes 1390 and 1392.

FIG. 15 is a process flow diagram illustrating an arrangement 1500 in which, at 1510, a statement is received at a database system. The statement may request one or more database operations. Then, at 1520, the statement is executed in the database system, causing one or more database operations. Selected database operations responsive to the statement are captured at 1530 and subsequently a workload reply file is generated at 1540. The workload replay file is then modified at 1550. The modified workload replay file can, at 1560, then be replayed to create a new workload based on the modified captured database operations.

FIG. 16 is a process flow diagram illustrating an arrangement 1600 in which, at 1610, a primary database is replicated, or mirrored, in a secondary database. One or more client application statements are then received at 1620. At, 1630, the received client application statements are load balanced between the primary database and the secondary database for execution. Concurrently or subsequently, at 1640 a workload replay file is replayed to generate additional statements directed to the primary database system and the secondary database system. Then, at 1650, statements generated by the workload replay is received. The statements generated by workload replay are then load balanced 1660 between the primary database system and the secondary database system for execution. The database operations responsive to the client application statements and responsive to the statements generated by workload replay, may then be captured. At 1670, performance measures associated with the captured database operations may also be captured and stored for analysis.

FIG. 17 is a process flow diagram illustrating an arrangement 1700 in which, at 1710, a workload capture file is obtained. The workload capture file is modified, at 1720, by associating routing hints, conditions, or information with selected execution context information. The modified workload capture file is then replayed at 1730. Replaying of the modified workload capture file causes generation, at 1740, of routable statements based on the selected execution context information and the routing hints, conditions, or information. Subsequently, a determination is made, at 1750, based on the routing hints, conditions, or information to route the routable statements to a secondary database system for execution. And, at 1760, the routable statements are routed to the secondary database system for execution.

FIG. 18 is a process flow diagram illustrating an arrangement 1800 in which, at 1810, a system receives a workload replay file including one or more requests for database operations. At 1820, the workload replay file is modified to associate routing information with the database operations. The modified replay file may, at 1830, be replayed to generate routable statements based on database operations and routing information of the replayed modified replay file.

FIG. 19 is a process flow diagram illustrating an arrangement 1900 in which, at 1910, a modified workload replay file including routable statements is replayed. The routable read statements issued during replay are received, at 1920, at a database performing load balancing operations. At 1930, the database evaluates one or more parameters associated with the load balancing operations, and determines, at 1940, based on the evaluation that the routable statement may be routed to a second database. Then, at 1950, the routable statement is routed to a second database, where it may be executed. At 1950 the routing of the routable statement may further include routing the statement to a client application with instructions to route the statement to the second database system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computer processors forming part of at least one computing device, method comprising:
    obtaining, by at least one computer processor, a workload capture file comprising execution context information generated based on execution of read statements and write statements in a database system, the workload capture file being replayable by the one or more computer processors to issue the read statements and the write statements based on the execution context information;
    generating, by at least one computer processor, a modified workload capture file by generating modified execution context information by associating routing information with read execution context information associated with one or more of the read statements of the obtained workload capture file, the modified workload capture file comprising hint based routing information defining a favored database for execution of the one or more read statements; and
    replaying, by at least one computer processor, the modified workload capture file by:
        generating at least one mutable read statement based on the modified workload execution information;
        issuing the at least one mutable read statement to a primary database system, the primary database system having an associated secondary database system; and
        determining, by the primary database system, based on the routing information, that the at least one mutable read statement is routable to the secondary database system for execution;
        routing, by the primary database system, responsive to determining that the at least one mutable read statement is routable to the secondary database system for execution, the at least one mutable read statement to the secondary database system for execution.

2. The method for implementation by one or more computer processors of claim 1, further comprising executing, by at least one computer processor, upon receiving the at least one mutable read statement, the at least one mutable read statement in the secondary database system.

3. The method for implementation by one or more computer processors of claim 1, wherein the secondary database is configured to replicate the primary database system by transaction log replay, and determining that the at least one mutable read statement is routable to the secondary database system for execution further includes:
    determining, upon receiving the at least one mutable read statement by the primary database system, that at least one mutable read statement has associated routing information;
    evaluating one or more parameters associated with the transaction log replay; and determining based on the routing information and the one or more parameters that the at least one mutable read statement is routable executed in the second database.

4. The method for implementation by one or more computer processors of claim 3, wherein at least one of the one or more parameters associated with transaction log replay is indicative of a delay between a current primary database system time and a transaction log replay in the secondary database system.

5. The method for implementation by one or more computer processors of claim 1, wherein the database system is the primary database system, the secondary database system, or a tertiary database system that is separate and distinct from the primary database and the secondary database.

6. The method for implementation by one or more computer processors of claim 1, further comprising:
generating, by at least one computer processor, a plurality of performance measures associated with replaying the modified workload capture file.

7. The method for implementation by one or more computer processors of claim 6, wherein the workload capture file comprises a plurality of past performance measures associated with the execution of the read statements and the write statements in the database system, the method further comprising generating a report based on the performance measures or the past performance measures.

8. The method for implementation by one or more computer processors of claim 1, wherein replaying the modified capture file occurs at a computer system separate from the primary database system or the secondary database system.

9. The method of claim 1, wherein the modified workload capture file is generated based on user input via a user input interface screen.

10. A implemented method for implementation by one or more computer processors forming part of at least one computing device, the method comprising:
receiving, by a primary database system associated with a standby database system that is capable of executing read queries intended for the primary database system, a read query request, the read query request originating from a workload replayer for replaying a workload capture file comprising database operation information associated with previously executed queries and subsequently modified to include test query routing information indicative that the read query request is executable by the standby database system based on filtered database operation information having irrelevant information removed;
determining, by the primary database system, upon receiving the read query request that the read query request includes test query routing information;
evaluating, by the primary database system, one or more system parameters related to the state of the standby database system or the state of the primary database system;
generating, by the first database system, a determination that the test read query request is routable to the standby database system, the determination based on the query routing information and the one or more parameters; and
routing, by the primary database system, the read query request to the standby database system.

11. A method for implementation by one or more computer processors forming part of at least one computing device, the method comprising:
capturing, in a workload replay file, database operations of a database system responsive to one or more requests for database operations, the workload replay file (i) capable of being replayed to recreate the captured one or more requests and (ii) comprising at least one of (a) hint based routing information defining a favored database for execution of the one or more requests for database operations or (b) filtered database operations having irrelevant operations removed; and
associating routing information with the captured database operations, the routing information indicative that, when replaying the workload replay file to generate a new request for database operations based on the captured database operations and the associated routing information, wherein the new request for database operations is routable to a secondary database system for execution when a primary database system and the secondary database system are in a load balancing configuration.

12. The method for implementation by one or more computer processors of claim 11, wherein the routing information includes a condition that must be met before the new request for database operations is routable to the secondary database system.

13. The method for implementation by one or more computer processors of claim 12, wherein the condition requires that a lag between the primary database system and the second database system not exceed a threshold, the lag being based on a system clock of the primary database system and a most recent commit timestamp of the secondary database system, the most recent commit timestamp being associated with a most recently committed database operation in the secondary database system during replication of primary database operations in the secondary database system.

14. The method for implementation by one or more computer processors of claim 11, the method further comprising replaying the workload replay file to issue the new request to the primary database system or the secondary database system.

15. The method for implementation by one or more computer processors of claim 14, wherein capable of being replayed includes containing information to recreate the one or more requests for database operations.

16. The method for implementation by one or more computer processors of claim 15, wherein the information includes context information stored in multidimensional schema.

17. The method for implementation by one or more computer processors of claim 16, wherein capturing database operations of a database system responsive to one or more requests for database operations includes capturing performance measures relating to:
updating an in-memory database;
generating transaction logs;
storing the transaction logs in a persistent state;
shipping the transaction logs to a replica database;
replaying the transaction logs at the replica database;
updating a second in-memory database of the replica database; and
executing routable statements on the second in-memory database.

18. The method for implementation by one or more computer processors of claim 17, further comprising issuing the new request to the primary database system.

19. The method for implementation by one or more computer processors of claim 18, further comprising:

receiving the new request at the primary database system;

determining that the new request is routable to the secondary system; and routing the new request to the secondary database system.

20. The method for implementation by one or more computer processors of claim 19, further comprising:

receiving the new request at the secondary database system;

evaluating one or more parameters associated with the routing information to determine if conditions are satisfied for executing the new request in the secondary database system;

selectively determining, based on the evaluation of one or more parameters associated with the routing information, to reject the new request or to execute the new request in the secondary database system; and executing the new request in the secondary database system.

\* \* \* \* \*